(12) United States Patent
Wang

(10) Patent No.: US 7,447,666 B2
(45) Date of Patent: Nov. 4, 2008

(54) SYSTEM AND METHOD FOR ANALYZING A PATTERN IN A TIME-STAMPED EVENT SEQUENCE

(75) Inventor: Changzhou Wang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 994 days.

(21) Appl. No.: 10/821,454

(22) Filed: Apr. 9, 2004

(65) Prior Publication Data

US 2005/0235356 A1    Oct. 20, 2005

(51) Int. Cl.
*G06F 17/00* (2006.01)
*G06N 5/00* (2006.01)

(52) U.S. Cl. ............................ 706/45; 706/14; 706/47
(58) Field of Classification Search ............... 706/14, 706/45, 47; 707/6
See application file for complete search history.

(56) References Cited

U.S. PATENT DOCUMENTS

| | | | |
|---|---|---|---|
| 5,742,811 A | 4/1998 | Agrawal et al. ............. 395/606 |
| 5,897,637 A | 4/1999 | Guha ........................ 707/101 |
| 5,983,224 A | 11/1999 | Singh et al. .................... 707/6 |
| 6,055,538 A | 4/2000 | Kessenich et al. ........... 707/101 |
| 6,061,682 A | 5/2000 | Agrawal et al. ................ 707/6 |
| 6,092,065 A | 7/2000 | Floratos et al. ................ 707/6 |
| 6,094,645 A | 7/2000 | Aggarwal et al. ............. 706/47 |
| 6,105,032 A * | 8/2000 | Bunda et al. ................ 707/101 |
| 6,138,117 A | 10/2000 | Bayardo ....................... 707/6 |
| 6,185,559 B1 | 2/2001 | Brin et al. ....................... 707/6 |
| 6,189,005 B1 * | 2/2001 | Chakrabarti et al. ............ 707/6 |
| 6,212,525 B1 | 4/2001 | Guha ........................ 707/101 |
| 6,230,151 B1 | 5/2001 | Agrawal et al. ............... 706/12 |
| 6,236,982 B1 | 5/2001 | Mahajan et al. .............. 706/45 |
| 6,272,478 B1 | 8/2001 | Obata et al. .................. 706/12 |
| 6,292,802 B1 | 9/2001 | Kessenich et al. .......... 707/101 |
| 6,317,700 B1 | 11/2001 | Bagne ....................... 702/181 |
| 6,385,608 B1 | 5/2002 | Mitsuishi et al. ............... 707/6 |
| 6,473,757 B1 | 10/2002 | Garofalakis et al. ............ 707/6 |
| 6,496,817 B1 | 12/2002 | Whang et al. .................. 707/2 |
| 6,516,288 B2 | 2/2003 | Bagne ....................... 702/179 |
| 6,526,405 B1 * | 2/2003 | Mannila et al. ................ 707/6 |
| 6,539,373 B1 | 3/2003 | Guha ............................ 707/3 |
| 2004/0260517 A1 * | 12/2004 | Ding et al. .................. 702/186 |

OTHER PUBLICATIONS

John F. Roddick et al., A Survey of Temporal Knowledge Discovery Paradigms and Methods, Aug. 2002, IEEE, 1041-4347/02, 750-767.*

(Continued)

*Primary Examiner*—Joseph P Hirl
(74) *Attorney, Agent, or Firm*—Harness, Dickey & Pierce, P.L.C.

(57) ABSTRACT

Various embodiments and implementations include a system and method for determining distinct occurrences of a pattern in a sequence of time-stamped event instances by determining a maximum cardinality of disjoint occurrences of the pattern in the one or more sequences. The present disclosure also includes estimating an expected quantity of distinct occurrences of a pattern in a sequence of time-stamped events assigned to event categories. The present disclosure further includes identifying a surprise pattern within a sequence of time-stamped events.

46 Claims, 10 Drawing Sheets

OTHER PUBLICATIONS

Heikki Mannila et al, Discovery of Frequent Episodes in Event Sequences, 1997, Kluwer Academic Publishers, 259-289.*

Agrawal, Rakesh, et al., *Mining Sequential Patterns*, Eleventh International Conference on Data Engineering, Taipei, Taiwan, 1995, IEEE Computer Society Press.

Gusfield, Dan, *Algorithms on Strings, Trees, and Sequences*, Computer Science and Computational Biology, 1997.

Han, Jiawei, et al., *Scalable Frequent-Pattern Mining Methods: An Overview*, KDD Tutorial Notes, 2001, Aug. 26-29, 2001, San Francisco, CA., Cambridge University Press,.

Han, Jiawei, et al., *Mining Frequent Patterns without Candidate Generation*, Proceedings on International Conference on Management of Data 2000 (SIGMOD'00).

Joshi, Mahesh et al., *A Universal Formulation of Sequential Patterns*, Technical Report No. 99-21, May 20, 1999, Department of Computer Science, University of Minnesota, Minneapolis.

Leung, Carson Kai-Sang, et al., *OSSM: A Segmentation Approach to Optimize Frequency Counting*, 18th International Conference on Data Engineering 2000, Feb. 26-Mar. 1, 2002, San Jose, California.

Mannila, Heikki, et al., *Discovering Generalized Episodes Using Minimal Occurrences*. In KDD, pp. 146-151, 1996. See.

Mannila, Heikki, et al., *Discovering Frequent Episodes in Sequences*. KDD Tutorial Notes, pp. 210-215, 1995. See.

Mannila, Heikki, et al., *Discovery of Frequent Episodes in Event Sequences, Data Mining & Knowledge*, Technical Report C-1997-15, Department of Computer Science, University of Helsinki, Finland, Series of Publications C, Feb. 26, 1997.

Pei, Jian, et al., PrefixSpan: *Mining Sequential Patterns Efficiently by Prefix-Projected Pattern Growth.*, 17th International Conference on Data Engineering, Apr. 2-6, 2001, pp. 215-224. See.

Pei, Jian, et al., *Mining Sequential Patterns with Constraints in Large Databases*, 11th International Conference on Information and Knowledge Management, pp. 18-25, Nov. 4-9, 2002, McLean, Virginia.

Roddick, John F. et al., *A Survey of Temporal Knowledge Discovery Paradigms and Methods*, IEEE Transactions on Knowledge and Data Engineering, vol. 14, No. 4, 2002 pp. 750-767.

Srikant, Ramakrishnan, et al., *Mining Sequential Patterns: Generalizations and Performance Improvements*, 5th Int'l Conference on Extending Database Technology (EDBT), Avignon, France, 1996.

Thomas, Shiby, et al., *Mining Generalized Association Rules and Sequential Patterns Using SQL Queries*, Fourth International Conference on Knowledge Discovery and Data Mining, pp. 344-348, 1998.

Yang, Jiong, et al., *Mining Long Sequential Patterns in a Noisy Environment*, Proceedings of the ACM SIGMOD International Conference on Management of Data, pp. 406-417, Jun. 3-6, 2002.

Zaki, Mohammed J., *SPADE: An Efficient Algorithm for Mining Frequent Sequences*, Machine Learning, vol. 42, No. 1, pp. 31-60, 2001.

\* cited by examiner

SYSTEM AND METHOD FOR ANALYZING A PATTERN IN A TIME-STAMPED EVENT SEQUENCE

FIELD

The present disclosure relates to data processing, and more particularly, to the field of data mining of time-stamped events in a temporal sequence and identification of a surprising pattern in the sequence.

BACKGROUND

With prevalent application of computer technology to transactions and business operations, a very large amount of operational event data is being generated and stored in databases. In many applications, the stored event data includes a time-stamp that provides for the identification of the time of occurrence of the event. While a very large amount of sequential data is stored in databases, generally only a limited amount is analyzed due to the high cost in mining the data. As such, many patterns of interesting events remain hidden.

It is generally desirable to identify patterns of data events that define relationships between two or more data events. One such method for identifying patterns of data events within sequences is data mining. Data mining generally is the extraction of knowledge or patterns from data in databases or other information repositories. In contrast to simple database searches, data mining finds each sequence with at least one pattern satisfying the constraint.

A large volume of event data has been collected in applications such as maintenance records and web click applications. For example, a sequence of maintenance events may include a list of operational or failure events ordered by time of occurrence. Each event data item may include an identification of the particular event, the type or categorization of the event, and the time of occurrence. While events may be ordered in time, their contents have no ordering and are not easily compared to identify a trend or pattern.

One example of maintenance events stored in a temporal sequence is operational events associated with an aircraft. Each sequence may be associated with a particular aircraft and two or more sequences may be associated with a fleet of aircraft. Such aircraft maintenance event sequences are different than a simple time series. Maintenance events occur irregularly. Often, some time periods do not contain an event and other time periods containing two or more "overlapping" events.

For sequences containing temporal maintenance events, data mining methods and systems are generally designed to identify events that precede a hardware failure or maintenance event. The identified events usually are within a monitoring time range at which intervention may be possible to prevent a failure or to reduce a cost associated with the next event. Such patterns of events are generally subject to ordering and temporal constraints. Pattern occurrence is a fundamental concept in the sequential pattern data mining problems. As such, data mining methods may identify a pattern that forecasts a target event such as a failure or operational event.

A data mining task may include discovering sequential patterns among events, i.e., co-occurrences of multiple events and some ordinal or temporal relationship among them. The discovered patterns may be then interpreted as rules. An example pattern is an Engine Oil event followed by an Automatic Flight event in one to three days. This pattern can be interpreted as a sequential rule such as: If an Engine Oil event occurs within one to three days, an Automatic Flight event will occur.

As such, sequential pattern mining methods generally utilize pattern occurrence identification techniques. Pattern occurrence identification methods have been developed for sequential pattern discovery, filtering and ranking. In these methods, generally the recurrence of a pattern within the same sequence is ignored. Additionally, frequent pattern mining generally considers multiple sequences and often ignores pattern recurrences within a single sequence. However, the number of pattern occurrences in a single sequence can provide valuable insight especially for applications having long sequences each containing many events such as maintenance record data. For example, airplane maintenance records are usually kept for the life time of each airplane, and many patterns naturally repeat in the maintenance history of the same airplane. The number of occurrences within sequences might indicate problems of a particular airplane (while the number of occurrences across sequences might indicate problems of a group of airplanes).

One data mining method is a constraint-based mining method that utilizes user defined constraints defining the pattern to be mined and includes classification and association constraints. Another method includes distance-based association rules such as the density or number of events in an interval and/or the closeness of events in the interval.

Another method provides for the discovery of sequences of maximum length with support above a given threshold. A sequence is defined as an ordered list of elements where an element is defined as a set of items appearing together in a transaction. This method identified two data mining metrics, support and confidence. Support is defined as the extent to which the data is either positively or negatively relevant to the rule. Confidence is defined as the extent to which, within those that are relevant, the proposal is upheld.

Another method uses a sliding window on the input sequence to obtain a set of overlapping subsequences, and reports the number of subsequences in which the pattern occurs. Recurrences within a subsequence are ignored. Different numbers of occurrences for a pattern are a function of the selected window size. When the window size is large enough, all legitimate occurrences are considered. However, the same event instances or event pattern occurrences may be counted multiple times in multiple sliding windows even though there are only two instances of a particular event. The number of pattern occurrences increases as the window size increases. However, this method is limited as the choice of window size is critical. In addition, the sliding window approach is static and not very robust. For example, increasing the window size introduces a different number of new occurrences for different patterns, and thus changes the order of patterns in terms of the pattern occurrence or other derived measures.

In another method, only the minimal pattern occurrences are counted. In such a method, an occurrence is identified as minimum if no other occurrence can be found in any proper sub-interval of its time span. Legitimate occurrences of the pattern that are not "minimal" are ignored. However, a more constrained pattern may have more minimal occurrences. As such, such a method produces an unexpected result due, in part, to the exclusion of some legitimate occurrences.

Another data mining method includes the identification of an interesting pattern where events of an episode occur close in time. An episode is a conjunction of events bound to a given variable and that satisfies unary and binary predicates declared for those variables, e.g., a collection of events occurring frequently together or partially ordered collection of events occurring together. The method distinguishes between serial and parallel episodes and between simple and non-simple episodes, where a simple episode contains only unary predicates and no binary predicates. In this method, a time window is a user defined width of time defining how close the events must occur to each other within the episode. A window is a slice of an event sequence. An event sequence is a sequence of partially overlapping windows. The user may also specify how many windows an episode has to occur to be considered a frequent episode. Episodes that occur frequently within a sequence are determined.

In yet another method, a number of disjoint occurrences is determined. This method addresses discreet events and their relationship to each other, but does not allow for time overlapping events within the sequence. As such, this method is not applicable to patterns and sequences containing maintenance events or web transactions that inherently have time overlapped events.

Each of these methods is limited in their application and effectiveness in determining or identifying a pattern within a sequence of time-stamped events or categories. Therefore, the inventor of the present method and system believes it would be desirable for a method and system to effectively and efficiently provide for the identification of a pattern in a sequence of time-stamped events. The inventor also believes that it would be desirable for a method to provide for the identification of surprising patterns within one or more temporal sequences.

SUMMARY

In one implementation, a method determines distinct occurrences of a pattern in one or more sequences of time-stamped event instances. The method includes determining a maximum cardinality of disjoint occurrences of the pattern in the one or more sequences.

In another implementation of the method, an expected quantity of distinct occurrences of a pattern in a sequence of time-stamped events assigned to event categories is determined. The pattern includes a first event category and a second event category that is within a time gap of the first event category. The time gap has a minimum time gap and a maximum time gap, and the sequence has a maximum time length. The method includes counting instances of the first event in the sequence and counting instances of the second event in the sequence. The method also includes determining the expected quantity of distinct occurrences of the pattern as a function of the quantity of first event instances, the quantity of second event instances, the maximum time length of the sequence, the minimum time gap, and the maximum time gap.

In yet another implementation of the method, a surprise pattern within a sequence of time-stamped event instances is identified. The method includes calculating an expected quantity of distinct occurrences of a pattern in the sequence. The method also includes determining a maximum cardinality of the pattern in the sequence. The method further includes identifying the surprise pattern as a function of the estimated quantity of distinct occurrences and the maximum cardinality.

In still another embodiment, a system determines distinct occurrences of a pattern in a sequence of time-stamped event instances. The system includes means for storing the sequence and means for defining the pattern. The system also includes means for determining a maximum cardinality of disjoint occurrences of the pattern in the sequence.

In another embodiment, a computer readable medium includes computer executable instructions for determining distinct occurrences of a pattern in a sequence of time-stamped event instances. The computer executable instructions include means for determining a maximum cardinality of disjoint occurrences of the pattern in the sequence.

In still another embodiment, a system estimates an expected quantity of distinct occurrences of a pattern in a sequence of time-stamped events assigned to event categories. The pattern has a first event category and a second event category, with the second event category being within a time gap of the first event category. The time gap has a minimum time gap and a maximum time gap and the sequence has a maximum time length. The system includes means for counting instances of the first event in the sequence and means for counting instances of the second event in the sequence. The system also includes means for determining the expected quantity of distinct occurrences of the pattern as a function of the quantity of first event instances, the quantity of second event instances, the maximum time length of the sequence, the minimum time gap, and the maximum time gap.

In yet another embodiment, a computer readable medium includes computer executable instructions for estimating an expected quantity of distinct occurrences of a pattern in a sequence of time-stamped events. The time stamped events are assigned to event categories. The pattern has a first event category and a second event category, wherein the second event category being within a time gap of the first event category. The time gap has a minimum time gap and a maximum time gap. The sequence has a maximum time length. The computer executable instructions include means for counting instances of the first event in the sequence and means for counting instances of the second event in the sequence. The computer executable instructions also includes means for determining the expected quantity of distinct occurrences of the pattern as a function of the quantity of first event instances, the quantity of second event instances, the maximum time length of the sequence, the minimum time gap, and the maximum time gap.

In another embodiment, a system identifies a surprise pattern within a sequence of time-stamped event instances. The system includes means for storing the sequence of time-stamped event instances and means for defining the pattern. The system also includes means for calculating an expected quantity of distinct occurrences of a pattern in the sequence. The system further includes means for determining a maximum cardinality of the pattern in the sequence. The system also includes means for identifying the surprise pattern as a function of the estimated quantity of distinct occurrences and the maximum cardinality.

In yet another embodiment, a computer readable medium includes computer executable instructions for identifying a surprise pattern within a sequence of time-stamped event instances. The computer executable instructions include means for calculating an expected quantity of distinct occurrences of a pattern in the sequence. The computer instructions also include means for determining a maximum cardinality of the pattern in the sequence. The computer instructions further includes means for identifying the surprise pattern as a function of the estimated quantity of distinct occurrences and the maximum cardinality.

Some implementations and embodiments of the present disclosure provide for improved efficiency and effectiveness for mining patterns in sequences of time-stamped events. This provides for lower data mining costs and increases the opportunity for mining data. Some embodiments also provide for improved identification of surprising patterns in one or more sequences.

Further aspects and features of the present disclosure will be in part apparent and in part pointed out in the detailed description provided hereinafter. The features, functions, and advantages can be achieved independently in various embodiments of the present disclosure or may be combined in yet other embodiments.

BRIEF DESCRIPTION OF THE DRAWINGS

The present disclosure will become more fully understood from the detailed description and the accompanying drawings, wherein.

DETAILED DESCRIPTION

Figure 1:
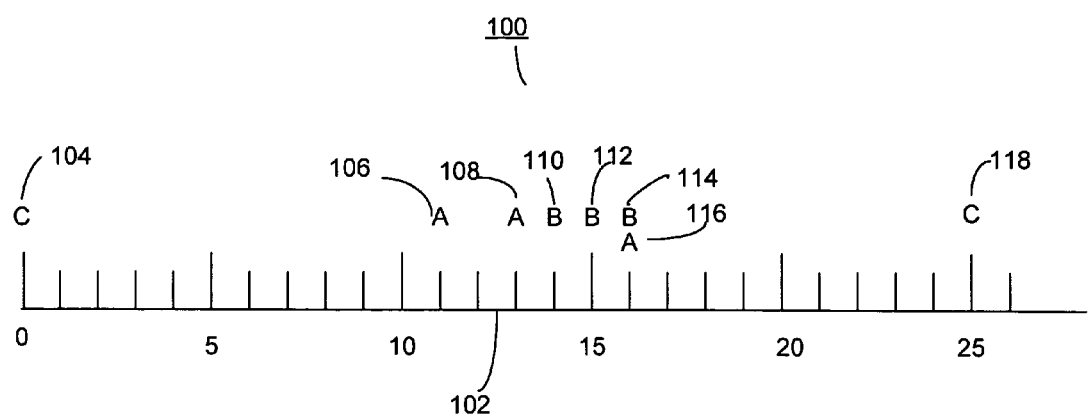
FIG. 1 is a sequence of time-stamped categories of events according to one embodiment of the present disclosure.

The following description of the implementations and embodiments is merely exemplary in nature and is in no way intended to limit the present disclosure, its application, or uses. For purposes of clarity, the same reference numbers are used in the drawings to identify similar elements.

Before describing a system or method for determining the maximum cardinality of a pattern in a sequence, determining the expected maximum cardinality, and identifying a surprising pattern in a sequence, one or more concepts associated with a sequence will be introduced and defined. Thereafter, a detailed description of various embodiments will be described.

Following is a list of symbols and terms used throughout this specification. This listing is intended for illustration purposes and is not intended to be limiting.

1. $e$—an event instance.
2. A, B, C, D, and E—Capital Letters are indicative of categories of events.
3. $C(e)$—a category of event instance $e$
4. $b$=a factor for determining the mean of the expected maximum cardinality
5. $c$—a maximum cardinality of pattern P in sequence s.
6. $d$—a parameter that is a function of alternating adjustment factor over a range of indices is used to determine the incremental estimation parameter $\omega$.
7. $g$—a total number of groups in P pattern.
8. group—a set of events that may contain multiple copies of the same event categories with a group window size constraint.
9. $h$—a secondary index of event i used to go backward from event i.
10. $i$—an index of an event in the whole sequence.
11. $j$—an index number of the group.
12. $k$—a loop count index.
13. $l$—a data sequence maximum time range.
14. $m$—a total number of events in sequence s.
15. $n$—a number of event categories in a pattern, where $n_j$ is the number of event categories in the j-th group in a pattern P.
16. P—a pattern that is a collection of event categories with structural and temporal constraints. It is an ordered list of groups with minimum and maximum time gap constraints between any two consecutive groups. The gaps and window sizes are integers indicating time differences as specified in a time unit. Different gaps and window sizes may be present in the same pattern. If a group contains a single category, its window size is 0 and is omitted with the colon separator. Pattern P may, for example, be designated $\{A\}\alpha\text{-}\beta\{B\}$.
17. $p$—a probability of the occurrence of one event or category in relation to a second event of category. The probability p is approximately equal to the remainder of the maximum time gap minus the minimum time gap divided by the length of the sequence, e.g., $p=(\beta-\alpha)/(l)$. For any given instance of event A, there is a probability p that any event instance of B together with the event instance of A are an occurrence of the pattern P. For example, for a sequence having a length/of 1,000 seconds and a pattern P of $\{A\}1\text{-}10\{B\}$ where B is followed within 1 to 10 seconds of A, the probability is equal to $1\text{-}q=10/1000=0.01=1$ percent. As such, for any given event or category A instance within the sequence, there is a 1 percent change for any B instance such that these two instances are an occurrence of pattern P.
18. $q$—a parameter equal to one minus the probability p.
19. S—a set of a disjoint pattern.
20. $s$—a sequence of temporal events.
21. $T(e)$—a timestamp of the event instance e in sequence s.
22. $x$—a number of event instances of category or event A in sequence s [1, l].
23. $X_{x,y}$—a random variable of the number of occurrences of pattern $\{A\}\alpha\text{-}\beta\{B\}$ having x occurrences of A's and y occurrences of B's and that where $y \geq x \geq 0$.
24. $y$—a number of event instances of category or event B in sequence s [1, l].
25. $z$—an estimation index.
26. $\alpha_j$—a minimum time gap between the j-th group and the (j+1)-th group.
27. $\beta_j$—a maximum time gap between the j-th group and the (j+1)-th group.
28. $\gamma$—an estimation adjustment parameter.

29. δ—a base estimation of the mean of the expected maximum cardinality.

30. $\eta_x$—a number of instances of type $C_x$ events.

31. λ—an alternating adjustment factor.

32. μ—a bound to the mean of the expected maximum cardinality where $\mu^-$ is the minimum bound and $\mu^+$ is the maximum bound. The real mean is denoted a $\mu_r$.

33. $\xi_{i,j,b}$—a probability that $X_{i,j}$ equals b, i.e., $\xi_{i,j,b}$:=Pr$(X_{i,j}$= b).

34. ρ—an estimation precision objective that is a fraction of real mean $u_r$ such that the estimated bounds are tighter than this fraction, i.e., the upper bound minus the lower bound must be less than ρ.

35. σ—a loop counter where σ is one plus the number of loops or recurrences of the method.

36. ϕ—an estimation coefficient.

37. ψ—an incremental estimation parameter.

38. $\omega_j$—a window size of the j-th group.

An event instance e has a unique ID, a category name, and a timestamp. As indicated by sequence 100 in FIG. 1, timeline 102 indicates time periods from 0 to 26. Sequence 100 is a set of event instances of categories are indicated as A, B, and C. For example, event instance category C 104 occurred at time 0. The next event category A instance 106 is time stamped at time 11. A second event category A instance 108 is time stamped at time 13. Event category B instances occur at time periods 14, 15, and 16 as indicated by 110, 112, and 114. A third event category A instance 116 also occurs at time period 16 along with category B instance 114. A second category C instance 118 occurs at time period 25. Each of event category A, B, and C as indicated by 104 to 118 comprise sequence 100. As noted, in a sequence multiple event instances with the same category for A, B, and C may occur. Additionally, the sequence may include multiple instances of the same or of different categories at the same timestamp such as instance B 114 and instance A 116 at time period 16.

The method of the present disclosure may be used to analyze sequence 100 or other time stamped events in any sequence of time stamped events or categories. Sequences with different time units and difference time origins may also be analyzed with this method and system. Integer numbers are used in FIG. 1 to denote the event timestamp T, however, any numerical counting of a timestamp may apply.

A sequential pattern P may be described by one or more characteristics that may include those identified in Table 1.

TABLE 1

| Definitions of a Pattern | |
|---|---|
| Term | Definition |
| (pattern) | (group)((min gap) "–" (max gap) (group) )* |
| (group) | "{"(C)"}" | "{"(ω)":" (C) (C)+ "}" |
| (min gap) | (integer) |
| (max gap) | (integer) |
| (window size) | (integer) |

For example, a pattern {A}1–3{B} is a pattern with two groups each having a single category A and category B, respectively. The minimum gap and maximum gap between the two groups are 1 and 3 time units, respectively. In a pattern {2: A, B}6–8{3: B, A, B}13–15{C}, there are three groups {2: A, B}, {3: B, A, B}, and {C}. The first group has a window size of 2 and contains two event categories, one each of event category A and B. The second group has one category A and two copies of category B. The third group only has a single event category, category C.

From this, a general pattern may be described by Formula [1]:

$$\{\omega_1 : E_{1,1}, \ldots, E_{1,n1}\}\alpha_1 - \beta_1 \{\omega_2 : E_{2,1}, \ldots, E_{2,n2}\} \alpha_2 - \ldots - \beta_{g-1}\{\omega_g : E_{g,1}, \ldots, E_{g,ng}\} \quad [1]$$

An occurrence of this pattern in a given sequence is a subset of event instances in the sequence $\{e_{1,1}, \ldots, e_{1,n1}, e_{2,1}, \ldots, e_{2,n2}, \ldots, e_{g,1}, \ldots, e_{g,ng}\}$. As such, a pattern occurrence is a set of event instances satisfying particular structural and temporal constraints such as described in formula [2] to [5].

$$C(e_{i,j}) = E_{i,j}; \text{ when } 1 \leq i \leq g \text{ and } 1 \leq j \leq n_g \quad [2]$$

$$\max_j T(e_{i,j}) - \min_j T(e_{i,j}) \leq \omega_j; \text{ when } 1 \leq j \leq g \quad [3]$$

$$\max_j T(e_{i+1,j}) - \min_j T(e_{i,j}) \leq \beta_i; \text{ when } 1 \leq i \leq (g-1) \quad [4]$$

$$\max_j T(e_{i+1,j}) - \max_j T(e_{i,j}) \geq \alpha_i; \text{ when } 1 \leq i \leq (g-1) \quad [5]$$

The event categories in the pattern and the categories are in one-to-one correspondence. Event instances that are mapped to the same group occur in the corresponding window size. The time gap between any two event instances mapped to two consecutive groups is less than or equal to the specified maximum gap and no less than the specified minimum gap. For each event instance in the occurrence, an event instance matches an event category in the pattern when the event instance is mapped to the category in the one-to-one correspondence.

Two different occurrences of the same pattern are disjoint when the intersection of the two sets is empty. A set of occurrences of a pattern is a disjoint occurrence set when any two occurrences in the set are disjoint.

As an example, in sequence 100 of FIG. 1, a pattern in the illustrated temporal sequence may be identified. Counting the number of the occurrences may be based on a rule definition, as sequence 100 includes overlapping occurrences of some patterns. For example, one overlapping pattern is an event A followed by an event B in one to three time units. This pattern is defined as {A}1–3{B}. The occurrences of A may be identified and then a determination of whether an instance of B follows within the constrained temporal region of 1 to 3 time units. However, as there are multiple instances of B satisfying the pattern constraint, the method defines sets instances of "disjoint occurrences" to include all legitimate occurrences including those with overlapping events or categories. However, different occurrences in the same set do not share event instances.

A sequence may contain many different sets of disjoint occurrences. A maximum cardinality c of these sets of disjoint occurrences is the number of such disjoint occurrences and may be referred to as the occurrence-based frequency or o-frequency. The maximum cardinality c of all disjoint occurrence sets of a pattern in a sequence is defined and identified as a number or count of pattern occurrences in the sequence. The maximum cardinality c is a function of the sequence and the pattern and does not require an additional parameter such as a sliding window size. The maximum cardinality c ensures that patterns occur more often when a temporal constraint is relaxed. The maximum cardinality c is an occurrence-based frequency of a pattern in a data sequence for all disjoint occurrence sets in that sequence. If a sequence does not contain at least one occurrence of a pattern, the maximum cardinality c is zero. If a sequence contains at least one occurrence of the pattern, there is a disjoint occurrence set with the maximum cardinality c. As such, the maximum cardinality c has a lower-bound of zero and an upper-bound equal to the number of occurrences of the event category in the pattern having the least number of occurrences. As will be discussed further below, the maximum cardinality c may also provide for the estimation of the expected number of pattern occurrences or the expected maximum cardinality. This estimation of the expected number of pattern occurrences may also be compared to the counted occurrences to identify a surprising pattern.

The method provides, in one implementation, for determination of the maximum cardinality c by determining the quantity of the temporal patterns in sequences such that each event instance is used no more than once in counting pattern occurrences. For example, sequence 100 has six non-empty sets of disjoint occurrences of pattern {A}1–3{B}. These six non-empty sets are identified in Table 2 along with a count of the disjoint occurrences.

TABLE 2

Occurrences and Count of Disjoint Occurrences

| Occurrence Set | Occurrence of Cat X @ timestamp T | Disjoint Occurrence Count |
| --- | --- | --- |
| 1 | {{A @ 11, B @ 14}} | 1 |
| 2 | {{A @ 13, B @ 14}} | 1 |
| 3 | {{A @ 13, B @ 15}} | 1 |
| 4 | {{A @ 13, B @ 16}} | 1 |
| 5 | {{A @ 11, B @ 14}, {A @ 13, B @ 15}} | 2 |
| 6 | {{A @ 11, B @ 14}, A @ 13, B @ 16}} | 2 |

As shown in Table 2, the maximum cardinality c of pattern {A}1–3{B} in sequence 100 is two. As shown in FIG. 1 and Table 2, in occurrence set number 5, event category A instance 106 at time period 11 is only counted once. Event category A instance 108 at time period 13 is only counted once in determining the maximum cardinality. Similarly, event category B instance 110 at time period 14 is only counted once and event category B instance 114 at time period 15 is only counted once. As such, occurrence set number 5 has two disjoint occurrences, and the maximum cardinality is at least two. As shown in FIG. 1, event category A instance 116 at time period 16 is not followed by any other event category B instance, and there are only two other event category A instances 106 and 108. As such, the maximum cardinality is at most two.

As the method defines maximum cardinality, all occurrences of a pattern P are occurrences of a relaxed pattern $P_r$ of pattern P. Pattern P may be relaxed by several methods. A relaxed pattern $P_r$ may have one or more categories dropped or removed without dropping all categories from any group. Also, a relaxed pattern $P_r$ may have the first or the last group dropped. In the alternative, a relaxed pattern $P_r$ may include an increased window size for one or more groups. Similarly, a relaxed pattern $P_r$ may include increasing one or more maximum group gaps. In yet another relaxed pattern $P_r$, one or more minimum group gaps may be decreased.

As such, the maximum cardinality of all disjoint occurrence sets of the relaxed pattern $P_r$ is greater than or equal to the maximum cardinality of the original pattern P. For a given sequence the maximum cardinality of a pattern P with additional or narrower constraints, maximum cardinality is less than or equal to maximum cardinality of the broader pattern. For example, for pattern {A}1–3{B} in sequence 100, a more constrained pattern {A}2–3{B} also has a maximum cardinality of two or less.

Figure 2:
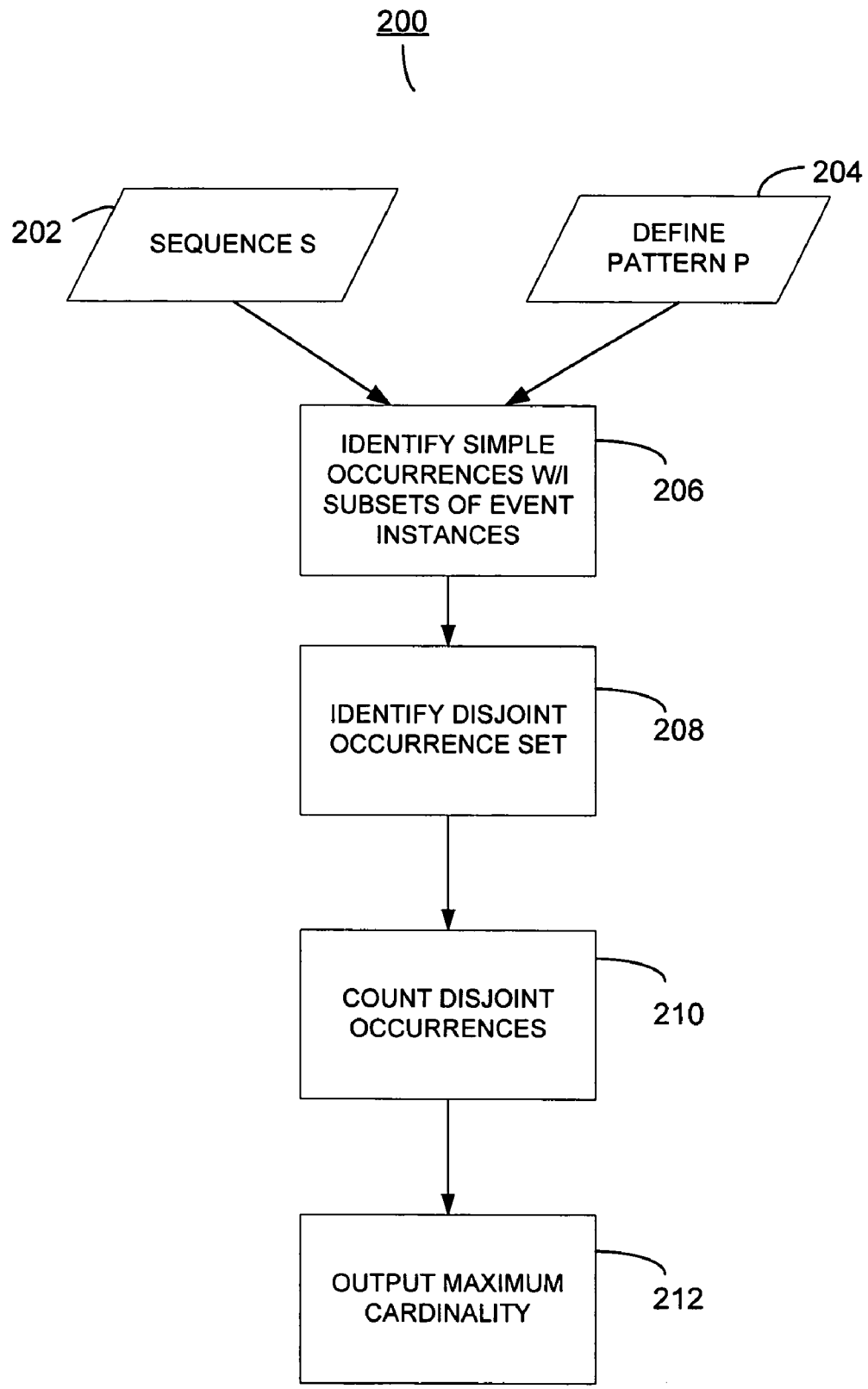
FIG. 2 is a flow chart illustrating a method of determining a maximum cardinality of a pattern in a sequence according to one implementation of the present disclosure.

In operation, one or more implementations provide for a method of determining the maximum cardinality c of a pattern P in a sequence s. In a method 200 of FIG. 2, one implementation of the method receives an input sequence s in operation 202 and a defined pattern P in operation 204. In operation 206, the method identifies all simple occurrences of the pattern within the subsets of event instances in sequence s. One or more disjoint occurrence sets are identified from the set of simple occurrences in operation 208. The sets of identified disjoint occurrence sets are counted in operation 210. The maximum cardinality c of pattern P in sequence s is output in operation 212.

This method may be applied easily to short data sequences. However, for large amounts of data and/or long sequences, such an approach has an exponential computing cost.

In other embodiments and implementations, a system and method determines distinct occurrences of a pattern in one or more sequences of time-stamped event instances. The method includes determining a maximum cardinality of disjoint occurrences of the pattern in the one or more sequences. The method may be embodied in computer executable instructions within a computer readable medium. The system or computer executable instructions include storing the sequence and means for defining the pattern. Also included is determination of a maximum cardinality of disjoint occurrences of the pattern in the sequence.

In one implementation, the method includes identifying a single disjoint occurrence set that has maximum cardinality. The method includes scanning the temporal data sequence along the time line. This scanning may be in the forward direction as illustrated, or may be in the reverse direction. The method may be a sequential flow with various process loops. In the method, the loop index "i" is a pointer indicating the current event under evaluation with a process operation of one or more of the process loops. Index i is therefore between zero and the total number of events "m" in the sequence. The index i is moved back and forth during the method. The method transitions when the index is greater than the total number of events m in the sequence. The number of matched occurrences "c" is updated during this process based on the evaluation and determinations of the method operations.

Figure 3:
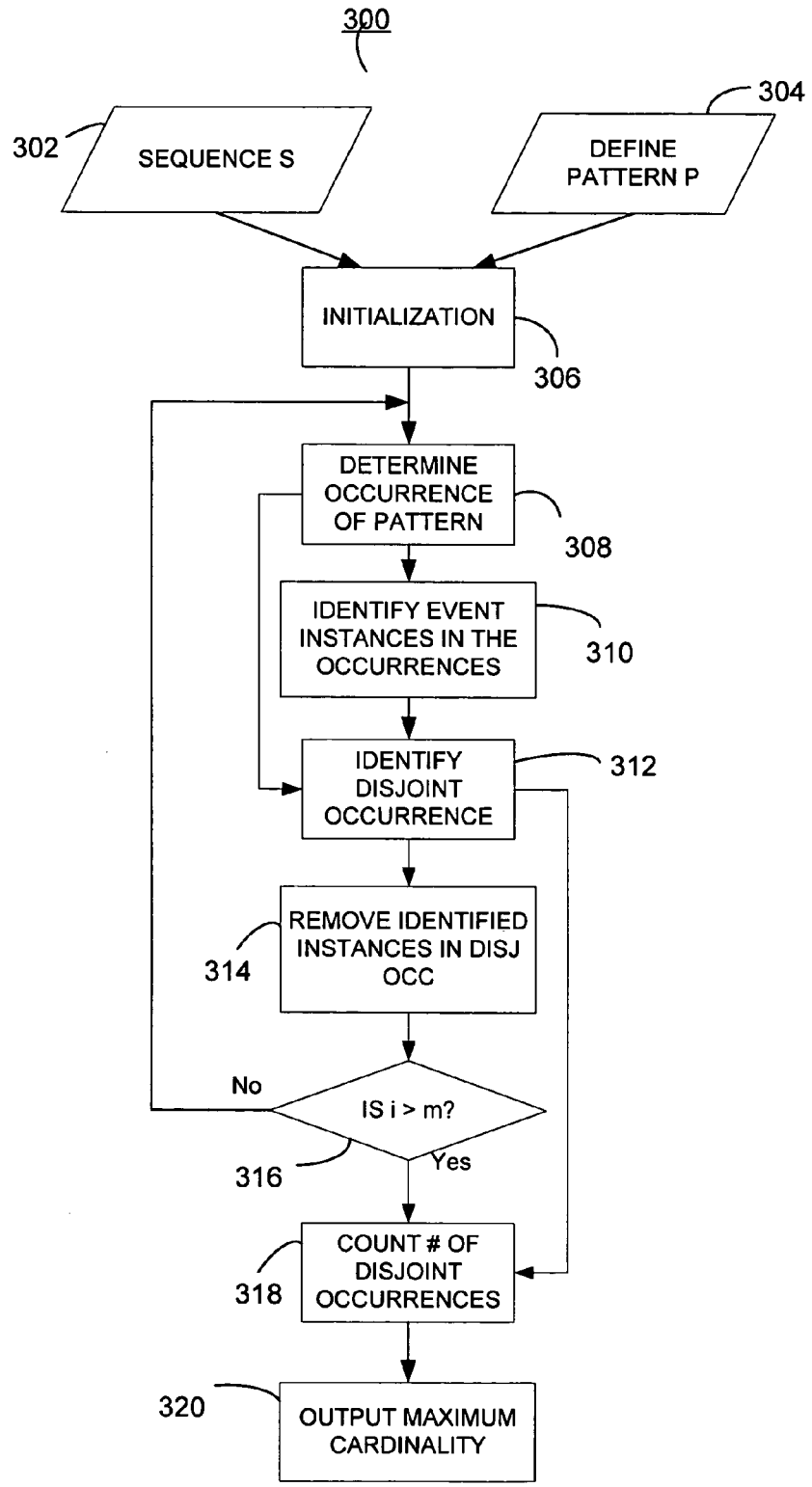
FIG. 3 is a flow chart illustrating a method of determining a maximum cardinality of a pattern within a sequence according to another implementation of the present disclosure.

Referring to FIG. 3, a method 300 illustrates another implementation of a method for determining the maximum cardinality of pattern P of operation 304 in sequence s of operation 302. Sequence s from operation 302 and pattern P from operation 304 are input into operation 306 to initialize method 300. The method continues in operation 308 with the determination of the occurrences of the pattern P in sequence s. This determination may be performed by mapping pattern recursively to the events and categories of sequence s or may be performed by using a pattern template or other method, one or more of which are described herein. Event instances in the determined occurrences are identified in operation 310 and the disjoint occurrences are identified using the determined occurrences from operation 308 and the identified event instances in the occurrences from operation 312. A disjoint occurrence count is provided from operation 312 to operation 318.

In operation 314, instances contained in the disjoint occurrence set of operation 312 are removed from the sequence under consideration. Operation 312 ensures that further analysis of the sequence does not utilize event instances or event category instances that have already been utilized in counting a disjoint occurrence set. In an alternative implementation, operation 312 could flag the event instances in lieu of removing them. Operation 316 provides a looping analysis function by comparing the current loop counter index i to the total number of events m in the sequence. When the index i is less than or equal to the total number of events m, operation 316 loop method back to operation 308 for further determination and analysis. Once index I is greater than the total number of events m, operation 316 breaks the looping and provides an indication to operation 318 that the process is complete. Operation 318 sums the total number of disjoint occurrences and provides operation 320 with the count. Operation 318 may also provide a listing of each disjoint occurrence set to operation 320 or as another output of method 300. Operation 320 provides the maximum cardinality of pattern p in sequence s as an output of method 300.

Figure 4:
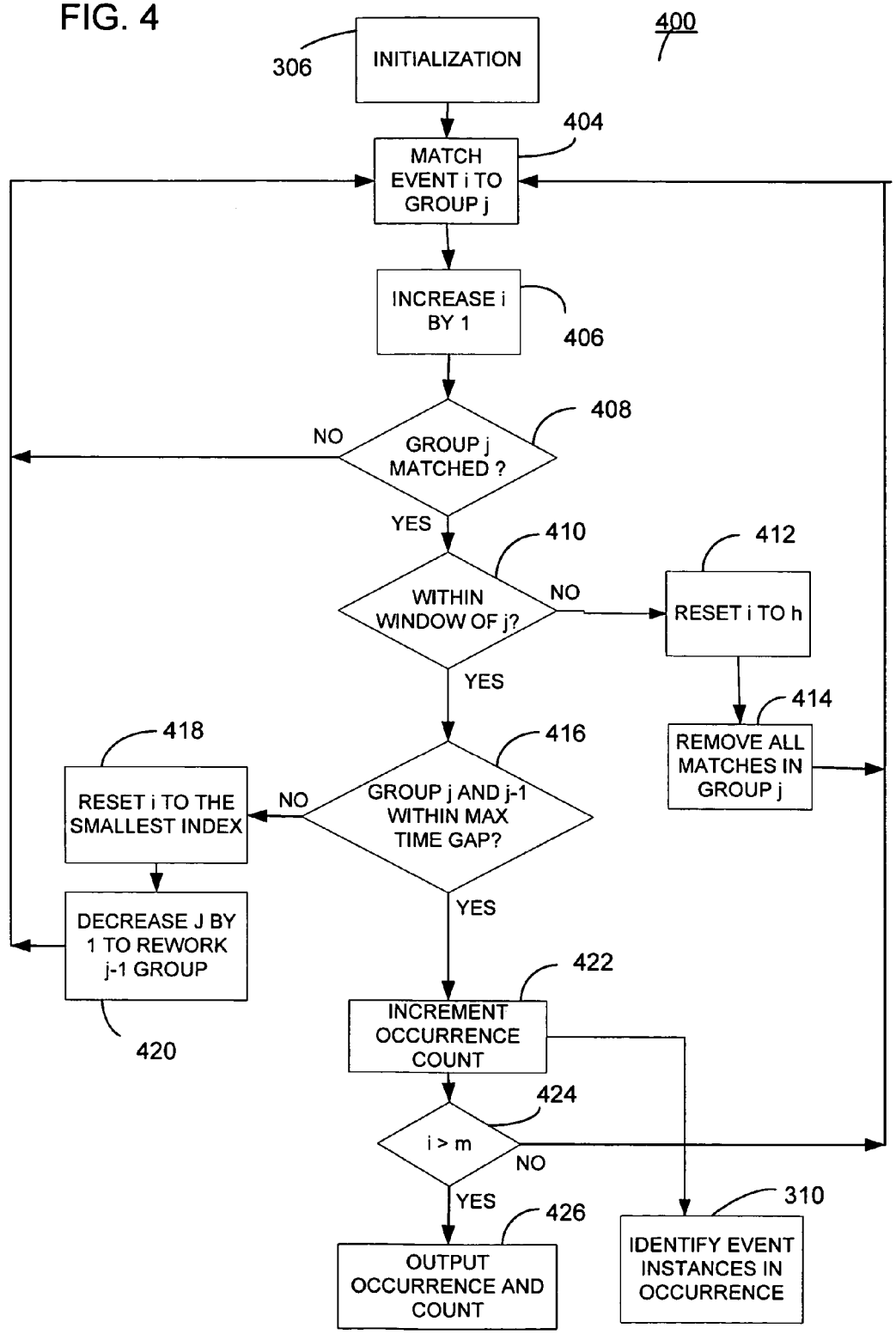
FIG. 4 is a flow chart illustrating a method of identifying event instances in occurrences within a sequence according to one implementation of the present disclosure.

Referring now to FIG. 4, method 400 is one implementation of the method of determining the occurrences of a pattern P in a sequence. As noted above, pattern P is defined as having one or more groups. This is one implementation of the method operation 308 of FIG. 3. Method 400 receives the initialization from operation 306 that includes the one or more sequences to be analyzed and the pattern P. In operation 404, event of index i is matched to a group j where j is an index number for the group under consideration.

Operation 406 increases loop index i by one and operation 408 checks to see if group j is matched. If group j is not matched, operation 408 routes method 400 back to operation 404 for further analysis. If group j is matched in operation 408, operation 410 checks to determine if the group is within the window of group j. If it is not, operation 410 routes the method to operation 412 where the loop index i is set to h, a secondary index. Secondary index h may be specified to be less than index i thereby moving the method backward from the previous index i. Next operation 414 removes all matches in group j and returns the method to operation 404 for further analysis.

If in operation 410 group j is matched and within the window of group j, the method continues in operation 416 where group j and group j minus one are determined to be within the maximum time gap defined by pattern P. If the time gap between group j and group j minus one is not within the maximum time gap of pattern P, operation 416 routes the method to operation 418 where the index i is reset to the smallest index. In operation 420, group index j is decreased by 1 so that in the next looping operation group j minus 1 is reworked or analyzed.

If in operation 416 the time gap between group j and group j minus one is within the maximum time gap for pattern P, the method continues to operation 422 where the occurrence count is incremented. The incremented occurrence count and/or the occurrence from operation 422 are provided to operation 310 that provides for the identification of event instances in the identified occurrences as described above with regard to operation 310 in FIG. 3. Additionally, operation 422 routes method 400 to operation 424 where the current loop index i is compared to the total number of events m in sequence s. If index i is less than or equal to the total number of events m, the method is looped back to operation 404 for further analysis. If however, index is greater than the total number of events m, the method is routed to operation 426 where the occurrences and occurrence count are output in operation 426.

Figure 5:
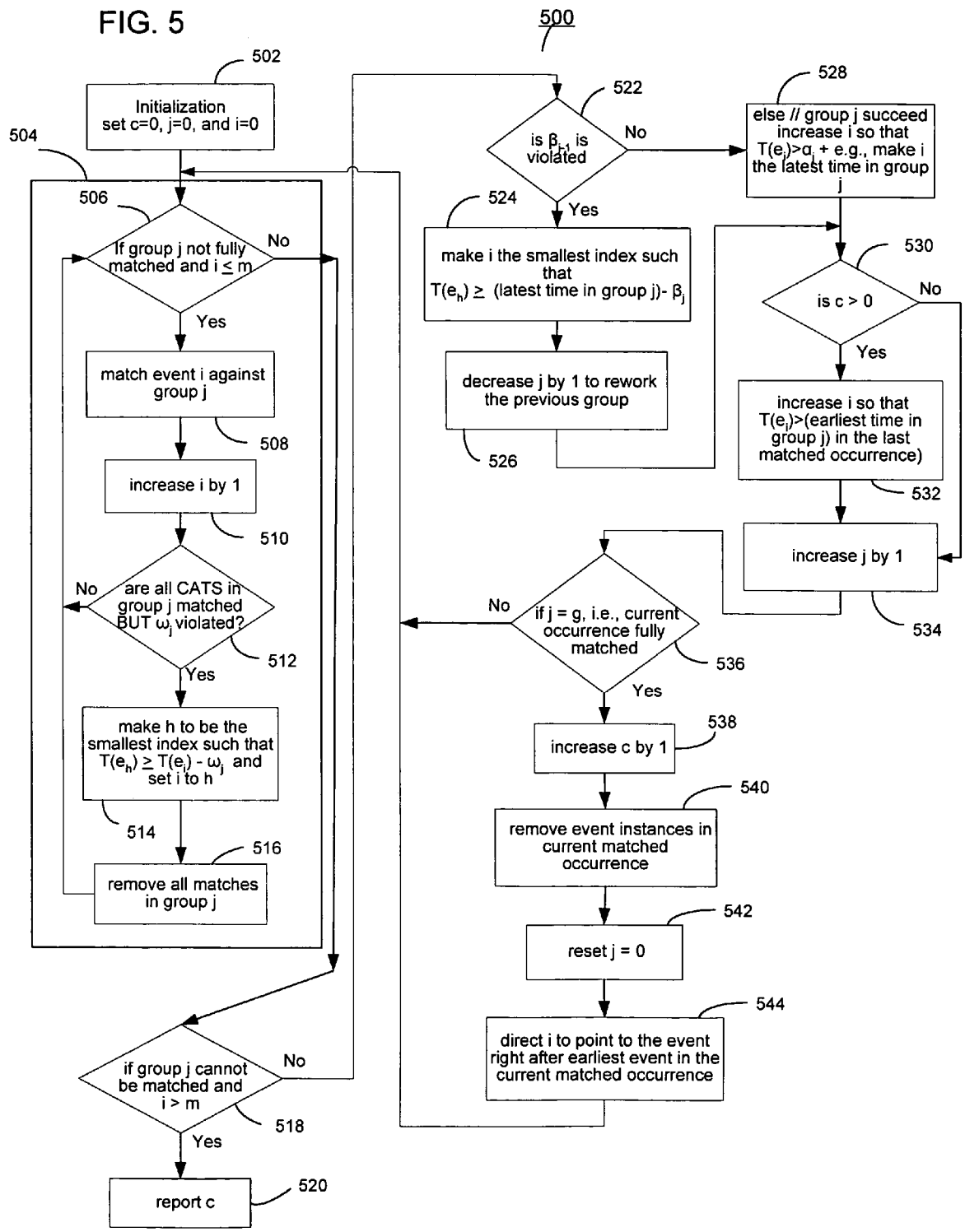
FIG. 5 is a flow chart illustrating a method of determining a maximum cardinality of a pattern within a sequence according to yet another implementation of the present disclosure.

Referring now to FIG. 5, method 500 illustrates another implementation for determining the maximum cardinality of a pattern in a sequence. The maximum cardinality of pattern P is determined in a given sequence s: $\{e_1, e_2, \ldots, e_m\}$, where events $e_m$ are temporally ordered by timestamps. Method 500 starts with an initialization of variables for the number of matched occurrences c, the number of matched groups j, and the index i of the event or instance in sequence s in operation 502.

To find an occurrence of a pattern, the method matches on a group-by-group basis, To match a group, multiple events may be required as may be specified by the pattern definition. Events within the sequence are matched to the events within a group of the pattern P in operation 504. Operation 506 checks whether group j is fully matched and whether index i is within the maximum events m in sequence s. Event index "i" is verified to be less than or equal to an "m" total number of events in sequence "s" such that the index i is within the current sequence s under consideration. As will be discussed, this verification is associated with the looping within operation 504 and operations 506 to 516. In these method operations, looped analysis of the sequence is performed and index i is updated as a function of one or more loops of the method of operation 506.

If group j is not fully matched and index i is within the total number of events m in the sequence in operation 506, the current event i is matched against group j in operation 508. In operation 510, index i is incremented to the next event. As illustrated here, index i is increased by 1 so that the next event is matched in a forward analysis loop. However, in an alternative implementation, index i may be initiated to total number of events m in operation 502 and decreased by 1 in operation 510 thereby providing for a backwards analysis loop.

All the events that result in a match group are determined and identified in operation 508. Once all categories in a group are matched to some event instance, the window size constraint on the group is checked in operation 512. Operation 512 determines whether all event categories in group j are matched and analyzes whether the window width $\omega_j$ for group j is within range or whether it is violated. If the constraint is violated, the method reverses or moves backward by a unit specified by the window size $\omega_j$. The method attempts to map the same group to try to identify another match.

If not within the group window width constraint, the matched events in the group j are discarded in operation 516. Similarly, if the group j is not fully matched and the window size $\omega_j$ is not violated in operation 512, the method loops back to operation 506 for further matching. The match process is looped back to operation 506 at a determined index later than the previous matching attempt. The methods within operation 504 are repeated until index i is out of range, i.e., index i is greater than the total number of events m in sequence s, and group j cannot be matched, or a match of group j is identified within the group window constraint.

When operation 516 is complete, no event category in group j is set as matched. Additionally, a new starting point for index i is established in operation 514 as secondary index h to rematch group j. The starting point h will be set greater than index i because the window width $\omega_j$ for group j was violated. The method operation 514 provides that the method does not repeatedly find the same set of matching events that violate the window width $\omega_j$ constraint. Operation 512 checks the matched events for compliance with the window width constraint as defined by the group definition.

The method illustrated by sub-operations 506 to 516 within operation 504 continuously loop until either a group j is matched or the index i is greater than the number of events m in sequence s as determined in operation 506. When group j is fully matched or index i is greater than total number of events m, the method checks to determine if group j cannot be matched and whether index i is greater than the total number of events m in operation 518.

The number of matched occurrences is returned at operation 520 when group j cannot be matched and index i is greater than the total number of events m in sequence s. As such, operation 520 reports the number of disjoint occurrences of pattern P in sequence s, e.g., the maximum cardinality c.

If in operation 518, group j can be matched and loop index i is less than or equal to the total number of events m in sequence s, the method continues at operation 522. That is, in operation 518 if there is at least one match of group j, then the process goes to operation 518 for further matching. In operation 522, the method checks whether the most recent group j is within the time-constraint with respect to the previous group, group j minus one, e.g., whether the maximum time gap $\beta_{j-1}$ is violated. When the most recent group j violates the maximum time gap $\beta_{j-1}$, the previous group j minus one is re-matched in addition to the current group j.

If the maximum time gap $\beta_{j-1}$ is violated, the starting position for matching the next group is determined in operations 524 and 526. In operation 524, the number of matched groups is decreased by 1, and the previous group and any groups following the previous group are re-matched. If the group is outside of the range, e.g., it is too far away from its preceding group per operation 522, the match for this group and the match for the preceding group are discarded. In this case, the method moves backward by a unit of the maximum gap, and attempts to match the preceding group as in operation 524 and 526.

When the maximum time gap $\beta_{j-1}$ is not violated in operation 522, the method continues to operation 528. When the time constraints of window width and time gaps are satisfied, operation 528 considers the partial match of the pattern from the first group to the current group to be valid. When the group is within range from the preceding group and the group is successfully matched, the method moves forward to skip the minimum gap in operation 528, and to skip the first item matched in this group in the previous matched pattern occurrence per operation 528, to match the next group.

In operation 532, the index i is advance by the minimum time gap $\alpha_j$ from the latest time in group j. In optional operations 530 and 532, the index i is advanced so that index i is greater than the first event of group j in the previously matched occurrence of pattern P. Optional operation 530 provides, in one implementation, for optimization of the method for some patterns within some sequences. In operation 532, index i is increased to a time of an event of group j that is greater than the earliest time in group j of the last match occurrence. In operation 534, the number of matched group j is increased by 1 and the process continues to operation 536 for matching of pattern P as a function of the matched group j. In addition, if in operation 530 there are no disjoint occurrences or fully matched patterns, then the method goes to operation 534 where the step index i is increased by one.

In operation 536, the method matches the groups to determine the occurrence of the whole pattern P such that the entire pattern definition of groups and window gaps are matched, e.g., no window width or group gap violations. If there are no violations, then an occurrence of pattern P is determined. In operation 538, the number of occurrences c is increased by one and the matched events either are removed from the sequence or are flagged in operation 540. The group number index j is reset to zero in operation 542 and may be looped back to operation 504 and specifically to operation 506 for further analysis. As an optional optimization method, once a pattern occurrence is identified in operation 536, all matched instances are removed from the sequence in operation 540. Event instances occurring before the first one in the matched pattern occurrence are ignored in operation 544 and the method loops back to operation 506 to find the next occurrence. This looping continues until group j is not fully matched and index i is greater then the m number of events in sequence s.

The method of removing or flagging of the matched events in operation 540 within the matched occurrence of pattern P ensures that a second or future matching does not include the same previously matched events. As previously discussed, the method of FIG. 5 provides for the determination of the maximum cardinality that is the number of discrete occurrences of pattern P in the one or more sequences. As such, no two discrete occurrences may have one or more events in common. However, two matched discrete events may temporally overlap. As such, removal or flagging of the events within the matched occurrence in operation 540 provides for further matching of events, groups, and patterns that do not re-use a previously matched event within the temporal sequence but enables further matching of temporally overlapping occurrences.

After operation 540, the method loops back to identify another occurrence of pattern P. Operation 536 checks to identify whether the identified groups comply with the pattern definition.

At the conclusion of operation 536, when at least one occurrence is identified, the matched group counter j is reset to zero in operation 542 and index i is reset for another loop. Index i is reset in operation 544 to an event immediately after the earliest event that was previously matched and removed or flagged. This optional method provides for an efficient method by looping back to a previous match rather than starting from the beginning.

Operation 504 is looped until loop index i is greater than the total number of events m in sequence s. Once index i is greater than the maximum number of events m, operation 504 directs the method to operation 518 that then directs the method to operation 520. Operation 520 provides for the output of the then current number of occurrences, e.g., maximum cardinality c. Outputting in operation 520 may include reporting, storing, transmitting, etc. the maximum cardinality c or o-frequency of pattern P in sequence s or in a plurality of sequences s.

Operation 504 addresses the matching of a group. The method does not start at the same time index i to match the same group more than once due to the methods of operations 514, 524, and 532. As such, the method provides for a maximum number of loops of O(mg) in operation 504. For each loop in operation 504, the group match operation 506 has a method cost of O(mn), where n is the number of categories in the pattern. Operations 518, 522-544 have a method cost O(m). Hence the overall method cost is less than or equal to $O(m^2gn)$.

Optionally, further operations not illustrated may be provided, some of which provide for optimization in particular situations. For example, if there are event categories in the pattern with very few occurrences in the sequence, such occurrences may be searched first to find pattern occurrences around such occurrences without requiring the matching of another part of the pattern.

For example, in an alternative implementation of operation 516, part of the matched occurrences satisfying the window width $\omega_j$ constraints may be reused rather than resetting the matching process for the j-th group. Other optional operations may be added that may provide for optimization of the method when addressing particular patterns and/or addressing particular sequences of temporal events.

The maximum cardinality provides for the determination or identification of a pattern within time-stamped sequence that includes overlapping temporally-related events. Such a method and system provides, in an example application, for the identification of related maintenance events. Once identified, improved maintenance practices may be prepared that provide for reduced equipment maintenance costs and improved equipment reliability.

Application of some implementations of the method described herein provide for the identification of new patterns rather than a simple search or retrieval and counting of an existing or known pattern.

Some implementations and embodiments may address the recurrence of a pattern in the same sequence of temporally-related events. Counting the occurrence frequency of a pattern in a sequence by determining the number of discrete recurrences of each pattern within the sequence.

While other data mining methods are very costly to enumerate all sets of occurrences for each pattern against each sequence in a database of time stamped events, embodiments of the present disclosure provide for reductions in the computational costs for data mining patterns in complex time-stamped event sequences.

In another implementation, the method provides for an estimation of the maximum cardinality. The method applies a probability assumption to determine the expected quantity of disjoint occurrences of the pattern as a function of various characteristics and/or parameters. These may include the total quantity for each event instance or category of event instances within a sequence and as included in the pattern. Also, these may include the maximum and minimum time gaps as defined by the patter and the maximum time length of the sequence.

In the exemplary implementations and embodiments discussed herein, for each type of event in a sequence, the method and system assumes that all instances are uniformly distributed for the time range of the sequence. Such example method also assumes that all events and all types of events are independently distributed. However, this is for illustration purposes as the method contemplates other event distributions may also be assumed and utilized in a similar manner.

The method assumes that the time of each instance in a sequences is a random variable, independent from other instances and uniformly distributed over the sequence time range. The method specifies that $X_{x,y}$ is a random variable of the number of occurrences of pattern $\{A\}\alpha-\beta\{B\}$ having x occurrences of A and y occurrences of B and that where $y \geq x \geq 0$. The method assumes that $\xi_{x,y;b}$ is the probability that $X_{x,y}=k$, i.e., $\xi_{x,y;b}:=\Pr(X_{x,y}=b)$. The method includes $p_y:=\xi_{1,y;1}$ and $q_y:=\xi_{1,y;0}$. As such, $p_y=(1-p)^y$ and $q_y=1-p_y=(1-p)^y$.

For any give x, y, and b, where $0<b<x$:

$$\xi_{x,y;0}=\xi_{1,y;0}\xi_{x-1,y;0}=q_y\xi_{x-1,y;0}=q_y^x \quad [6]$$

$$\xi_{x,y;b}=\xi_{1,y;0}\xi_{x-1,y;b}+\xi_{1,y;1}\xi_{x-1,y-1,b-1}=p_y\xi_{x-1,y-1;b-1} \quad [7]$$

$$x\xi_{x,y;x}=\xi_{1,y;1}\xi_{x-1,y-1;x-1}=p_y\xi_{x-1,y-1;x-1} \quad [8]$$

$$\mu_{1,y}=\xi_{1,y;1}=p_y \quad [9]$$

$$\mu_{x,y}=\mathrm{Exp}(X_x)=p_y+p_y\mu_{x-1,y-1}+q_y\mu_{x-1,y} \quad [10]$$

For any given event or category A, the probability p that any category or event B associated with category or event A is a discreet occurrence of pattern P where the probability p is equal to or greater than zero and less than or equal to one. In the method, the probability estimate $\mu_{x,y}$ of the value of the expected maximum cardinality is determined. Probability estimate $\mu_{x,y}$ may be determined by determining the mean $\mu_{1,y}$ for y instances of event B. In one implementation, the probability estimate $\mu_{x,y}$ is determined by a recursive method. For example, to determine $\mu_{3,4}$, both $\mu_{2,3}$ and $\mu_{2,4}$ must be determined. Similarly, to determine $\mu_{2,3}$, both $\mu_{1,2}$ and $\mu_{1,3}$ must be determined. However, in practice such a recursive method is very costly.

In one alternative implementation, the method estimates the mean $\mu_{x,y}$ as a function of a bound on the mean of the expected maximum cardinality. The method assumes there are x unique instances of pattern P that each consisting of η number of event B's. The method also assumes there are y instances of event B. The y instances of event B is greater than or equal to the product of the η sum of the random variables and the x number of incidences of event A, e.g., y number of instances of event B is greater than or equal to the produce of η and the x number of instances of event A.

In such an implementation, the method determines two boundary values of the mean of the expected maximum cardinality. To obtain an upper bound when counting the pattern $\{A\}\alpha-\beta\{B\}$, all event B's within pattern P are reused. To obtain the lower bound, one implementation of the method uses the determined number b of pattern P and separately y–ηb number of event B's. The determined b number of pattern P and y–ηb number of event B are used to count the combination of pattern P and event B. As such, in one implementation where an event B follows pattern P, the method determines a mean of the expected maximum cardinality to be bound by $\mu_{x,y}$ and $\max_{b=1\ldots x}(\mu_{k,y-\eta b})$.

In an alternative implementation, the bounds of the mean of the expected maximum cardinality are determined as a function of an estimation precision objective ρ. The estimation precision objective ρ is an integer or fraction of the real mean $\mu_r$ such that the estimated bounds are within the estimation precision objective ρ, i.e., the upper bound $\mu^+$ minus the lower bound $\mu^-$ should be less than or equal to the estimation precision objective ρ. As such, where two times the loop counter σ plus one is less than x number of occurrences of a category in sequence s, then the upper bound $\mu^+$ can be refined to meet the objective. Where two times the loop counter σ is less than x, then the lower bound $\mu^-$ can be refined to meet the objective.

Figure 6:
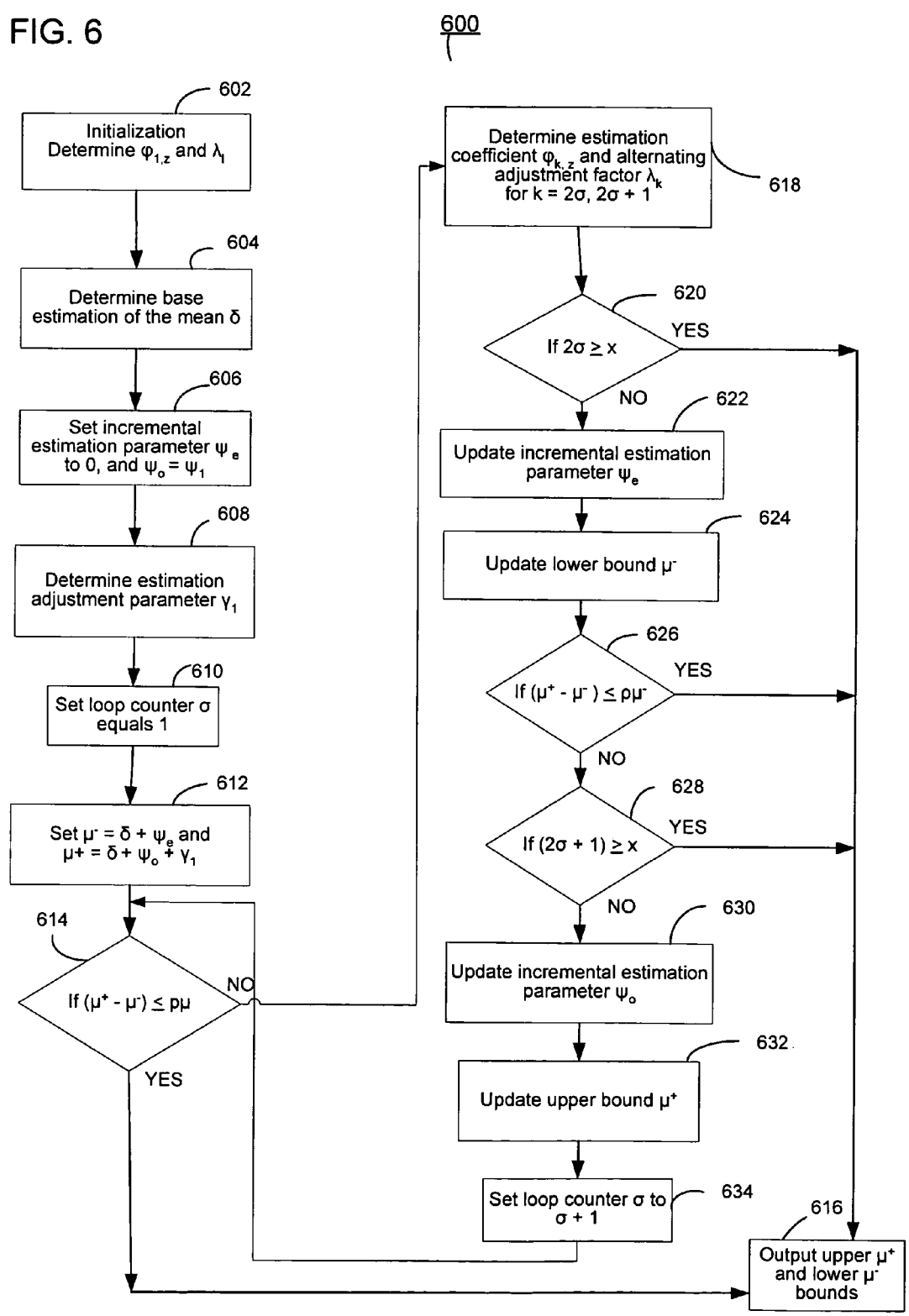
FIG. 6 is a flow chart illustrating a method estimating the expected maximum cardinality of a pattern within a sequence according to one implementation of the present disclosure.

The expected maximum cardinality may be determined by determining the lower bound $\mu^-$ and upper bound $\mu^+$ to the mean μ of the expected maximum cardinality. One such method 600 is illustrated in the flowchart of FIG. 6. As with the above, the pattern P is $\{A\}\alpha-\beta\{B\}$ is only described here for illustration purposes only. It should be noted, however, similar operations may be applied to other patterns.

Method 600 determines the lower bound $\mu^-$ and the upper bound $\mu^+$ for the mean of the expected maximum cardinality as a function of an estimation precision objective p of the real mean $\mu_r$. When the x number of instances of A is small, the maximum number a of method loops is also small, and the bound may not be tight or within estimation precision objective p of the real mean $\mu_r$. However, when index i is larger than a predetermined threshold $i_{max}$, the estimation yields very tight bounds within the estimation precision objective ρ of the real mean $\mu_r$. Such a threshold $i_{max}$ may be a function of various parameters including the length of the sequence, the categories or events in the sequence, and the pattern P time gaps.

For this method, the x number of occurrences of event A, the y number of occurrences of event B, the probability p (that derives q from one minus the probability p), and estimation precision objective ρ are provided as inputs into the method and the lower bound $\mu^-$ and the upper bound $\mu^+$ are provided as outputs.

In the implementation illustrated in FIG. 6, method 600 determines an estimate for the lower bound $\mu^-$ and the upper bound $\mu^+$ for the expected maximum cardinality c. In operation 602, the method determines an estimation coefficient $\phi$ and an alternating adjustment factor $\lambda$. In operation 604, a base estimation of the mean of the expected maximum cardinality $\delta$ is determined. In operation 606, an incremental estimation parameter $\psi_e$ for the event or category of events is determined and an incremental estimation parameter $\psi_o$ is set to a first instance of the incremental estimation parameter $\psi_1$.

Next, operation 608 determines an estimation adjustment parameter $\gamma$. Loop counter $\sigma$ is set to one in operation 610. In operation 612, an initial lower bound $\mu^-$ is determined as a function of adding the incremental estimation parameter $\psi_e$ to the base estimation $\delta$ of the mean of the expected maximum cardinality. An initial upper bound $\mu^+$ is determined by adding the null incremental estimation parameter $\psi_o$ and the estimation adjustment parameter $\gamma$ to the base estimation $\delta$ of the mean of the expected maximum cardinality.

After the initial upper bound $\mu^+$ and lower bound $\mu^-$ are determined in operation 612, the method refines the upper bound $\mu^+$ or lower bound $\mu^-$ by a looping analysis. Operation 614 checks the upper and lower bounds to determine if their combination is within a predetermined range and variance. Operation 614 determines whether the relative difference between the upper and lower bounds (as defined by $\mu^+$ minus $\mu^-$) is smaller than a predefined estimation precision value $\rho$ around the real mean $\mu_r$. If the difference is less than or equal to the product of the estimated precision value $\rho$ and the real mean $\mu_r$, no further refinement of the upper bound $\mu^+$ or lower bound $\mu^-$ are required. As such, the looping breaks to route the method to operation 616 and the initial values of the upper bound $\mu^+$ and lower bound $\mu^-$ are provided as the range of the expected maximum cardinality. If however, the upper and lower bounds is greater than the product of the estimated precision value $\rho$ and the real mean $\mu_r$, method 600 refines the lower bound $\mu^-$ and/or the upper bound $\mu^+$ in a looping process until neither can be further refined.

For example, in one implementation, further refinement to the upper bound $\mu^+$ is determined to not be necessary when two times the $\sigma$ number of loops is equal to or greater than x number of occurrences of a category in the sequence. Similarly, the lower bound $\mu^-$ may be evaluated to determine whether further refinement is desired. This occurs when the sum of two times the number of loops $\sigma$ and one is equal to or greater than x number of occurrences of a category in the sequence.

In order to refine the upper and lower bounds, estimation coefficient $\phi_{k,z}$ as a function of the current loop k and the estimation index z are determined in operation 618. Additionally, alternating adjustment factor $\lambda_k$ for the current loop k is determined in operation 618 for two values, the first at two times the current loop index $\sigma$ and the second at the sum of two times the current loop index $\sigma$ and 1.

The method checks the current loop index $\sigma$ in operation 620. If the current loop index $\sigma$ is a value such that the product of two and the current loop index $\sigma$ is greater than or equal to x number of occurrences of a category in the sequence, the loop breaks. The method routes to operation 616 where the current values of the upper and lower bounds are reported as the range of the expected maximum cardinality.

If however, the product of two and the current loop index $\sigma$ is less than x number of occurrences of a category in the sequence, the refined factors of operation 618 are used in operations 622 and 624 to refine the lower bound $\mu^-$. The incremental estimation parameter $\psi_e$ for event e is determined in operation 622 and the lower bound $\mu^-$ is re-determined as a function of the re-determined incremental estimation parameter $\psi_e$ in operation 624.

Operation 626 re-checks the variance condition against a predefined variance threshold or the estimation precision objective $\rho$. Operation 626 checks the range of the upper and lower bounds to determine if it is within a predetermined range and variance. Operation 626 determines whether the relative difference between the upper and lower bounds (as defined by $\mu^+$ minus $\mu^-$) is smaller than a product of the predefined estimation precision value $\rho$ and the lower bound $\mu^-$. If the difference is less than or equal to the product of the estimated precision value $\rho$ and the lower bound $\mu^-$, further refinement of the upper bound $\mu^+$ or lower bound $\mu^-$ is not required. As such, the looping breaks to route the method to operation 616 and the initial values of the upper bound $\mu^+$ and lower bound $\mu^-$ are provided as the range of the expected maximum cardinality. If however, the upper and lower bounds is greater than the product of the estimated precision value $\rho$ and the lower bound $\mu^-$, method 600 refines the upper bound $\mu^+$.

Operation 628 checks the current loop index $\sigma$. If the current loop index $\sigma$ is a value. The sum of one plus the product of two and the current loop index $\sigma$ is compared to the x number of occurrences of a category in the sequence. If the sum is greater than or equal to the x number of occurrences, method 600 breaks and routes to operation 616 for reporting of the current values of the upper and lower bounds as the range of the expected maximum cardinality.

If however, the sum is less than the x number of occurrences, operation 630 updates the incremental estimation parameter $\omega_o$. The upper bound $\mu^+$ is updated in operation 632 as a function of the updated incremental estimation parameter $\psi_o$ of operation 630. The method continues to the next loop by indexing the loop index by one in operation 634. After operation 634, the method loops back to operation 614 to determine whether further refinement is desired by checking whether the re-determined bound range is within the estimation precision range.

Generally, the method illustrated in FIG. 6 determines the estimated upper bound $\mu^+$ and lower bound $\mu^-$ in a three process method. First, initialization derives an initial lower bound $\mu^-$ and upper bound $\mu^+$ through operation 608. A second process refines the lower bound $\mu^-$ and than the upper bound $\mu^+$ until neither of them can be further refined by operations 620 and 628, or the bounds are tight such that their relative difference is equal to or smaller than the estimation precision objective p. Third, the refined estimated upper bound $\mu^+$ and lower bound $\mu^-$ are provided as outputs in operation 616. It should be understood, however, that in another implementation, the order of refining upper bound $\mu^+$ and lower bound $\mu^-$ may be reversed, or both may be refined in the same method operation.

Another implementation of the method according to the present disclosure is disclosed in an algorithm form in Appendix B. The method provides for a determination of the lower bound $\mu^-$ and upper bound $\mu^+$ of the mean of the expected maximum cardinality of pattern P in sequence s. The minimum bound $\mu^-$ and maximum bound $\mu^+$ are first estimated and then refined to within a predetermined estimation precision objective. The method with the estimation precision objective $\sigma$ ensures a bounding of the mean of the expected maximum cardinality utilizing an incremental and iterative looping process.

In another implementation, a method for determining the estimated bounds of expected maximum cardinality is a function of estimation and bound tightness relationships as provided in formula [11] to [25]:

$$\varphi_{1,0} = 1 \quad [11]$$

$$\varphi_{1,1} = -1 \quad [12]$$

$$\varphi_{k,z} = -(\varphi_{k-1,z-1})/(1-q^z) \quad [13]$$

$$\varphi_{k,0} = \sum_{z=1}^{k} -\varphi_{k,z} q^z \quad [14]$$

$$\lambda_l = q^{2(y-x+1)} \quad [15]$$

$$\lambda_k = -\lambda_{k-1}(1-q^k)q^{y-x+1} \quad [16]$$

$$d_{k,1} = \lambda_1 \sum_{z=0}^{l} \varphi_{l,z} q^{k(z+1)} \quad [17]$$

$$\delta = x - (q^{y-x+1}(1-q^x))/(1-q) \quad [18]$$

$$\psi_0 = 0 \quad [19]$$

$$\psi_1 = q^{2y-2x+3}(1-q) \quad [20]$$

$$\psi_{2\sigma+1} = \psi_{2\sigma-1} + \sum_{l=1}^{2\sigma-1}(d_{2\sigma,1} + d_{2\sigma+1,l}) \quad [21]$$

$$\psi_{2\sigma} = \psi_{2\sigma-2} + \sum_{l=1}^{2\sigma-2}(d_{2\sigma-1,l} + d_{2\sigma,l}) \quad [22]$$

$$y_k = \sum_{l=1}^{k}\left(\lambda\bigg/\sum_{z=0}^{l}\varphi_{l,z}(q^{(z+1)(k+1)} - q^{x(z+1)})/(1-q^{z+1})\right) \quad [23]$$

$$\mu^+ = \delta + \psi_{2\sigma+1} + y_{2\sigma+1} \quad [24]$$

$$\mu^- = \delta + \psi_{2\sigma} + \lambda_{2\sigma} \quad [25]$$

Some implementations of the method apply one or more of the relationships defined in formula [11] to [25] to determine the lower bound $\mu^-$ and upper bound $\mu^+$ of the mean of the expected maximum cardinality. One such implementation is illustrated in method 700 of FIG. 7 and another implementation is illustrated in Appendix C. As with the method of FIG. 6, method 700 illustrates one implementation of the method of the present disclosure by addressing exemplary pattern P is $\{A\}\alpha-\beta\{B\}$.

Method 700 determines the lower bound $\mu^-$ and the upper bound $\mu^+$ for the mean of the expected maximum cardinality as a function of an estimation precision objective $\rho$ of the real mean $\mu_r$. In operation 702, the method determines an estimation coefficient $\phi$ and an alternating adjustment factor $\lambda$. In operation 704, a base estimation $\delta$ of the mean of the expected maximum cardinality is determined. Base estimation $\delta$ may be determined by formula [18] as indicated in operation 704. In this operation, base estimation $\delta$ is a function of the predetermined probability p of the occurrence, the x number of occurrences of event or category A, and the y number of occurrences of event or category B. Of course if patter P defined others events or categories, their counted occurrences would also be a factor in this determination.

In operation 706, an incremental estimation parameter $\psi_e$ for the event or category of events is determined and an incremental estimation parameter $\psi_o$ is set to a first instance of the incremental estimation parameter $\psi_1$. Incremental estimation parameter $\psi_e$ may be defined per as indicated in operation 606 to be equal to zero. Incremental estimation parameter $\psi_o$ is set to be equal to incremental estimation parameter $\psi_1$. Incremental estimation parameter $\psi_1$ is defined in one implementation by formula [20] or in operation 706 as being a function of the predetermined probability p of the occurrence, the x number of occurrences of event or category A, and the y number of occurrences of event or category B as indicated.

An estimation adjustment parameter $\gamma$ is determined in operation 708 or in another implementation by application of formula [25]. Estimation adjustment parameter $\gamma$ is a function of alternating adjustment factor $\lambda$, the predetermined probability p of the occurrence, and the x number of occurrences of event or category A.

The loop counter $\sigma$ is set to one in operation 710. An initial lower bound $\mu^-$ is determined in operation 712 as a function of adding the incremental estimation parameter $\psi_e$ to the base estimation $\delta$ of the mean of the expected maximum cardinality. In addition, an initial upper bound $\mu+$ is determined in operation 712 by adding the odd incremental estimation parameter $\psi_o$ and the estimation adjustment parameter $\gamma$ to the base estimation $\delta$ of the mean of the expected maximum cardinality.

After the initial upper bound $\mu^+$ and lower bound $\mu^-$ are determined in operation 712, the method checks to determine if further refinement of the upper bound $\mu^+$ and/or lower bound $\mu^-$ is desirable. The method checks the range of the upper and lower bounds about the real mean Pr to determine if the range is within a predetermined estimation precision range. The predetermined bound range of the difference between the upper and lower bound (as defined by $\mu^+$ minus $\mu^-$) is compared in operation 714 to the estimation precision range (as defined as the product of the predefined estimation precision value $\rho$ and the real mean $\mu_r$). If the bound range is less than estimation precision range, than method 700 determines that the initial upper bound $\mu^+$ and lower bound $\mu^-$ are sufficiently tight about the real mean and further refinement of the upper bound $\mu^+$ and/or lower bound $\mu^-$ is not required. As such, method 700 breaks and routes to operation 716 where the current values of the upper bound $\mu^+$ and lower bound $\mu^-$ are provided as the range for the expected maximum cardinality.

If however, operation 714 determines that the bound range is greater than or equal to the estimation precision range, method 700 refines the upper bound $\mu^+$ and the lower bound $\mu^-$ in operations 718 to 734 in a looping process. The looping process of operations 718 to 734 continue until the bound range as determined in operation 714 is less than the estimation precision range.

For example in one implementation, further refinement to the lower bound $\mu^-$ is determined to not be necessary when two times the $\sigma$ number of loops is equal to or greater than x number of occurrences of a category in the sequence. Similarly, the upper bound $\mu^+$ is tested to determine whether further refinement is desired. This occurs when two times $\sigma$ number of loops of the method plus one is equal to or greater than x number of occurrences of a category in the sequence. When either the upper bound $\mu^+$ or lower bound $\mu^-$ are determined to not require further refinement, the looping operation of method 700 stops and the then current values of $\mu^+$ and $\mu^-$ are reported in operation 716 as the maximum and minimum bounds of the mean of the expected maximum cardinality.

In order to refine the upper and lower bounds, estimation coefficient $\phi_{k,z}$ as a function of the current loop k and the estimation index z are determined in operation 718. Additionally, alternating adjustment factor $\lambda_k$ for the current loop k is determined in operation 718 for two values, the first at two times the current loop index $\sigma$ and the second at the sum of two times the current loop index $\sigma$ and 1.

The method checks the current loop index σ in operation 720. If the current loop index σ is a value such that the product of two and the current loop index σ is greater than or equal to x number of occurrences of a category in the sequence, the method breaks. The method routes to operation 716 where the current values of the upper and lower bounds are reported as the range of the expected maximum cardinality.

If however, the product of two and the current loop index σ is less than x number of occurrences of a category in the sequence, the refined factors of operation 718 are used in operations 722 and 724 to refine the lower bound $\mu^-$. The incremental estimation parameter $\psi_e$ for event e is determined in operation 722 and the lower bound $\mu^-$ is re-determined as a function of the re-determined incremental estimation parameter $\psi_e$ in operation 724.

Operation 726 re-checks the variance condition against a predefined variance threshold or the estimation precision objective ρ. Operation 726 checks the range of the upper and lower bounds to determine if it is within a predetermined range and variance. Operation 726 determines whether the relative difference between the upper and lower bounds (as defined by $\mu^+$ minus $\mu^-$) is smaller than a product of the predefined estimation precision value ρ and the lower bound $\mu^-$. If the difference is less than or equal to the product of the estimated precision value ρ and the lower bound $\mu^-$, further refinement of the upper bound $\mu^+$ or lower bound $\mu^-$ is not required. As such, the looping breaks to route the method to operation 716 and the initial values of the upper bound $\mu^+$ and lower bound $\mu^-$ are provided as the range of the expected maximum cardinality. If however, the upper and lower bounds is greater than the product of the estimated precision value ρ and the lower bound $\mu^-$, method 600 refines the upper bound $\mu^+$.

Operation 728 checks the current loop index σ. If the current loop index σ is a value. The sum of one plus the product of two and the current loop index σ is compared to the x number of occurrences of a category in the sequence. If the sum is greater than or equal to the x number of occurrences, the looping operation of method 700 breaks and routes to operation 716 for reporting of the current values of the upper and lower bounds as the range of the expected maximum cardinality.

If however, the sum is less than the x number of occurrences, operation 630 updates the incremental estimation parameter $\psi_o$. The upper bound $\mu^+$ is updated in operation 732 as a function of the updated incremental estimation parameter $\psi_o$ of operation 730. The method continues to the next loop by indexing the loop index by one in operation 734. After operation 734, the method loops back to operation 714 until one of the predefined non-refinement criteria are met or exceeded.

Figure 7:
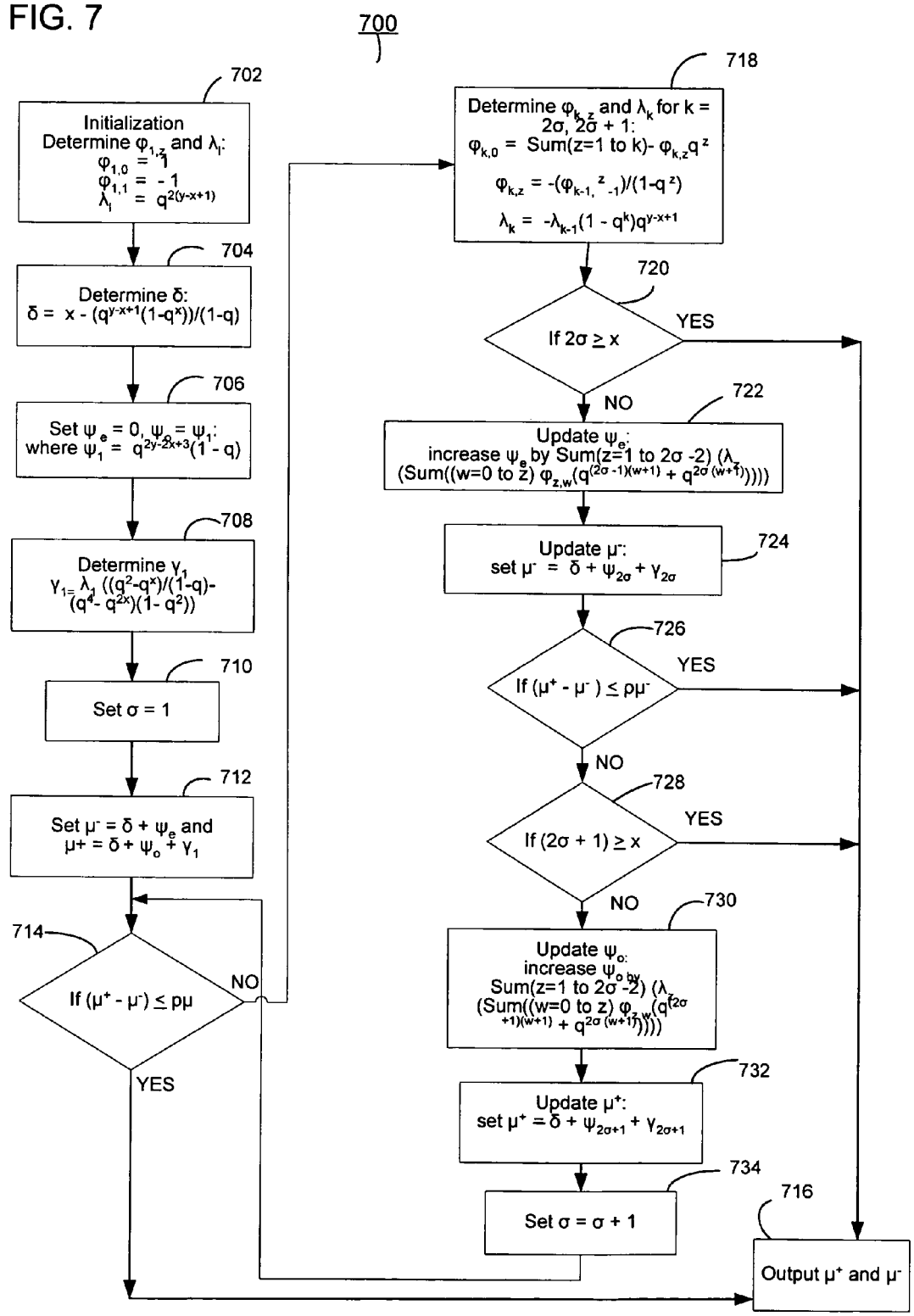
FIG. 7 is a flow chart illustrating a method estimating the expected maximum cardinality of a pattern within a sequence according to another implementation of the present disclosure.

Generally, the method illustrated in FIG. 7 determines the estimated upper bound $\mu^+$ and lower bound $\mu^-$ in a three process method. First, initialization derives an initial lower bound $\mu^-$ and upper bound $\mu^+$ through operation 708. A second process refines the lower bound $\mu^-$ and upper bound $\mu^+$ until neither of them can be further refined by operations 720 and 728, or the bounds are tight such that their relative difference is equal to or smaller than the estimation precision objective ρ. Third, the refined estimated upper bound $\mu^+$ and lower bound $\mu^-$ are provided as outputs in operation 716. It should also be understood that, in another implementation, the order of refining upper bound $\mu^+$ and lower bound $\mu^-$ may be reversed, or both may be refined in the same method operation.

As described, method 700 assumes that both event category A and B are independently and uniformly distributed. However, in other implementations, the method may assume and utilize events distributed under other distributions such as a Poisson distribution. In such cases, the methods disclosed herein for estimation of the minimum and maximum bounds of the mean of the expected maximum cardinality may be adopted for use with Poisson distributions or any other definable probability distribution.

The methods of FIG. 5, FIG. 6, FIG. 7, Appendix B, and Appendix C describe exemplary implementations for the method of estimating the expected maximum cardinality of a pattern within in sequence. Such methods for determining the mean of the expected maximum cardinality generally provide for improved operational performance of data mining systems and reduced computational costs.

Such an estimated maximum cardinality is useful in data mining for identifying a surprising or interesting pattern within one or more sequences. The identified surprising pattern may be a pattern that was not previously known or expected and therefore may be an indication of a change to the relationship of events, or may be the identification of a new pattern or relationship between events.

A surprise pattern in a sequence may be identified by determining an estimated of the expected maximum cardinality and comparing it to the determined maximum cardinality of the pattern in the one or more sequences. Such a comparison is a measure of the dependency of the correlated events in a sequence. Such a measure may be referred to as lift.

Figure 8:
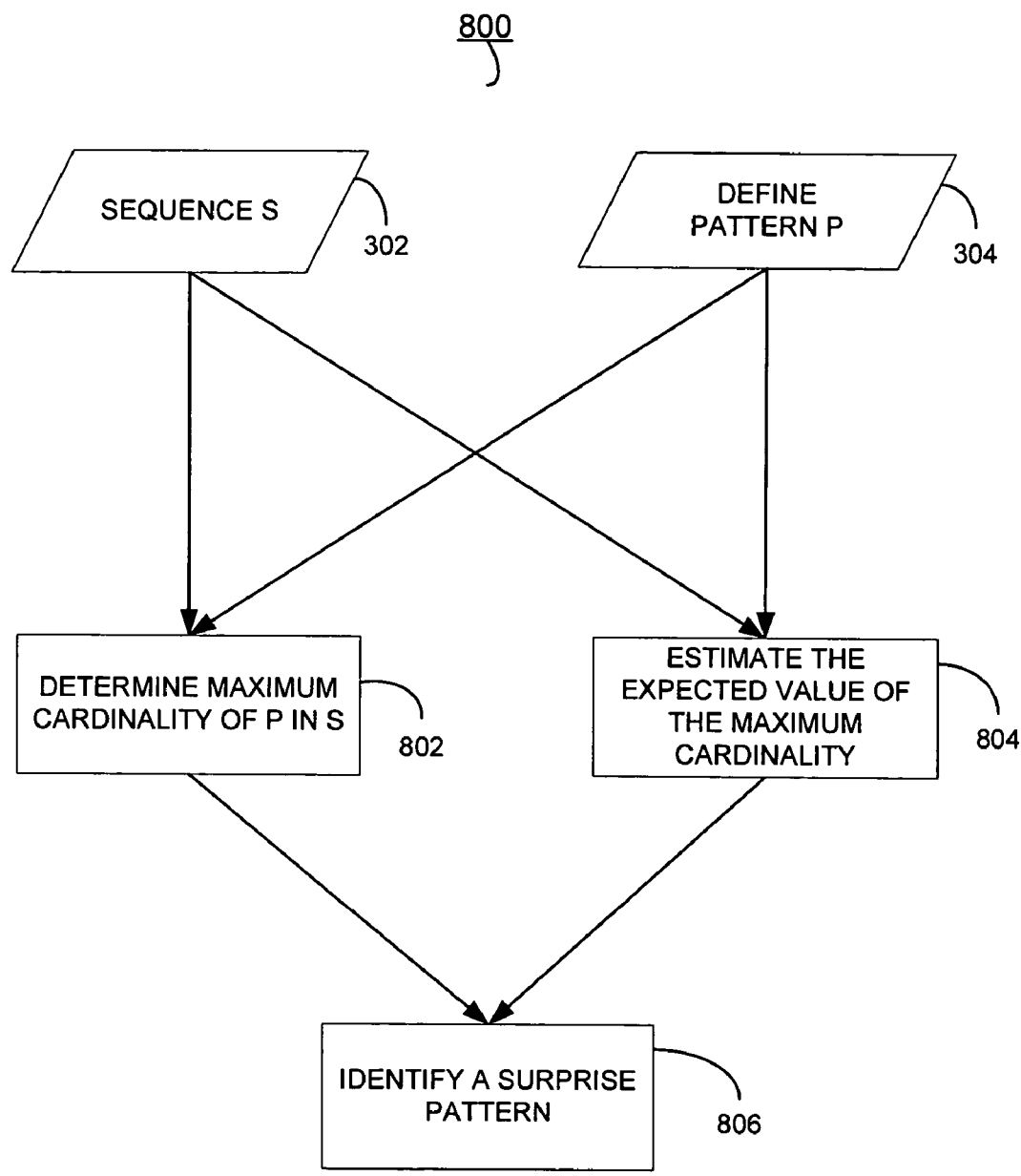
FIG. 8 is a flow chart illustrating a method identifying a surprising pattern in a sequence according to one implementation of the present disclosure.

A method 800 as illustrated in FIG. 8 is one implementation for identifying a surprise pattern. One or more sequences may be input into method 800 in operation 302. A pattern P is input into method 800 in operation 304. A maximum cardinality of pattern P in sequence s is determined in operation 802. Operation 802 operates one or more of the methods described above for the determination of the maximum cardinality. In Operation 804, the expected maximum cardinality is estimated. The expected maximum cardinality may be determined by one or more of the methods described above such as the estimation of the upper and lower bounds to the mean of the expected maximum cardinality. The determined maximum cardinality from operation 802 and the estimated expected maximum cardinality from operation 804 are provided to operation 806. Operation 806 identifies a surprise pattern by application of one or more determinations. Such determinations may include a comparison, a trending, an analysis, or otherwise.

For example, in one implementation, where the determined maximum cardinality of a pattern in one or more sequence deviates significantly from the expected value, a surprising pattern may be identified. Operation 806 may identify a surprising pattern when there is a large maximum cardinality and where the maximum cardinality differs from an expected value by more than a threshold level. In an exemplary implementation, a large maximum cardinality may be a maximum cardinality of greater than about 10. The threshold level for the difference may be about 20 percent. In such a case, operation 806 may identify a pattern, as a surprise pattern.

Operation 806 may also identify a surprising pattern when the determined or counted maximum cardinality is small and the absolute difference between the determined maximum cardinality and the expected value is greater than a small maximum cardinality threshold amount. A maximum cardinality may be small if, for example, it is less than or equal to about 10. A small maximum cardinality threshold amount may be a threshold of greater than about 30 percent.

Figure 9:
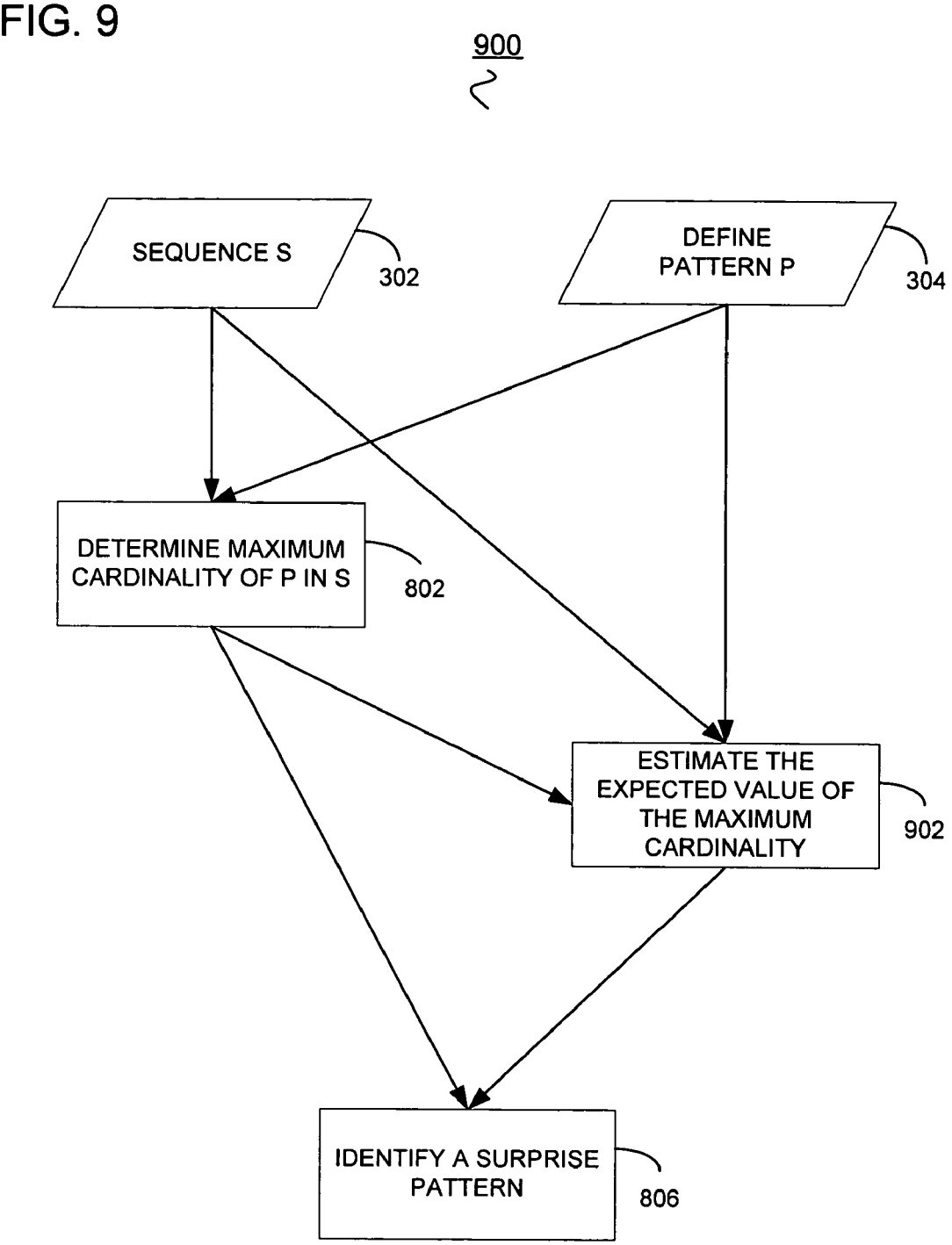
FIG. 9 is a flow chart illustrating a method identifying a surprising pattern in a sequence according to another implementation of the present disclosure.

In another implementation, method 900 as illustrated by the flow chart in FIG. 9 also provides for the identification of a surprise pattern. One or more sequences may be input into method 900 in operation 302. A pattern P is input into method 900 in operation 304. A maximum cardinality of pattern P in sequence s is determined in operation 802. Operation 802 operates one or more of the methods described above for the determination of the maximum cardinality. Operation 902 receives the sequence from operation 302, the pattern from operation 304, and the determined maximum cardinality from operation 802 to estimate the expected maximum cardinality. The expected maximum cardinality may be determined by one or more of the methods described above such as the estimation of the upper and lower bounds to the mean of the expected maximum cardinality. The determined maximum cardinality from operation 802 and the estimated expected maximum cardinality from operation 902 are provided to operation 806. Operation 806 identifies a surprise pattern by application of one or more determinations as described above.

As discussed, the determination of the maximum cardinality of a pattern in one or more sequences does not require extra parameters such as a sliding window size and does not depend on a particular algorithm or set of algorithms. The method is monotonic as patterns do not occur less frequently when their constraints are relaxed. The method provides for the determination of the maximum cardinality of a pattern within one or more sequences that may be implemented in a system using an efficient greedy algorithm. Additionally, the method estimates an expected maximum cardinality that can be compared to the determined maximum cardinality. From this, a pattern in a sequence may be evaluated to identify a surprising pattern.

The method estimates the maximum cardinality under different assumptions of data sequences thereby providing for identifying surprising patterns. The expected maximum cardinality is determined under an independent uniform distribution assumption. The independent uniform distribution assumption may reflect knowledge with regard to the dependency between events or the determined maximum cardinality. In practice, other pattern or distribution assumptions may be applied using the method. For example, a Poisson distribution may be adapted to the method based on the domain knowledge, and the knowledge of the event timing distributions within sequence s.

Persons skilled in the art will understand that the method disclose herein may be implemented in hardware or software and may be defined in software code, as a flow or decision chart, as one or more forms of a computer program product, and/or in an algorithm, such as a simple greedy algorithm. One or more computing systems that include programming means and/or computer readable medium with computer instructions for operating in accordance with the methods and operations of the methods described herein are included with the scope of the present disclosure.

Figure 10:
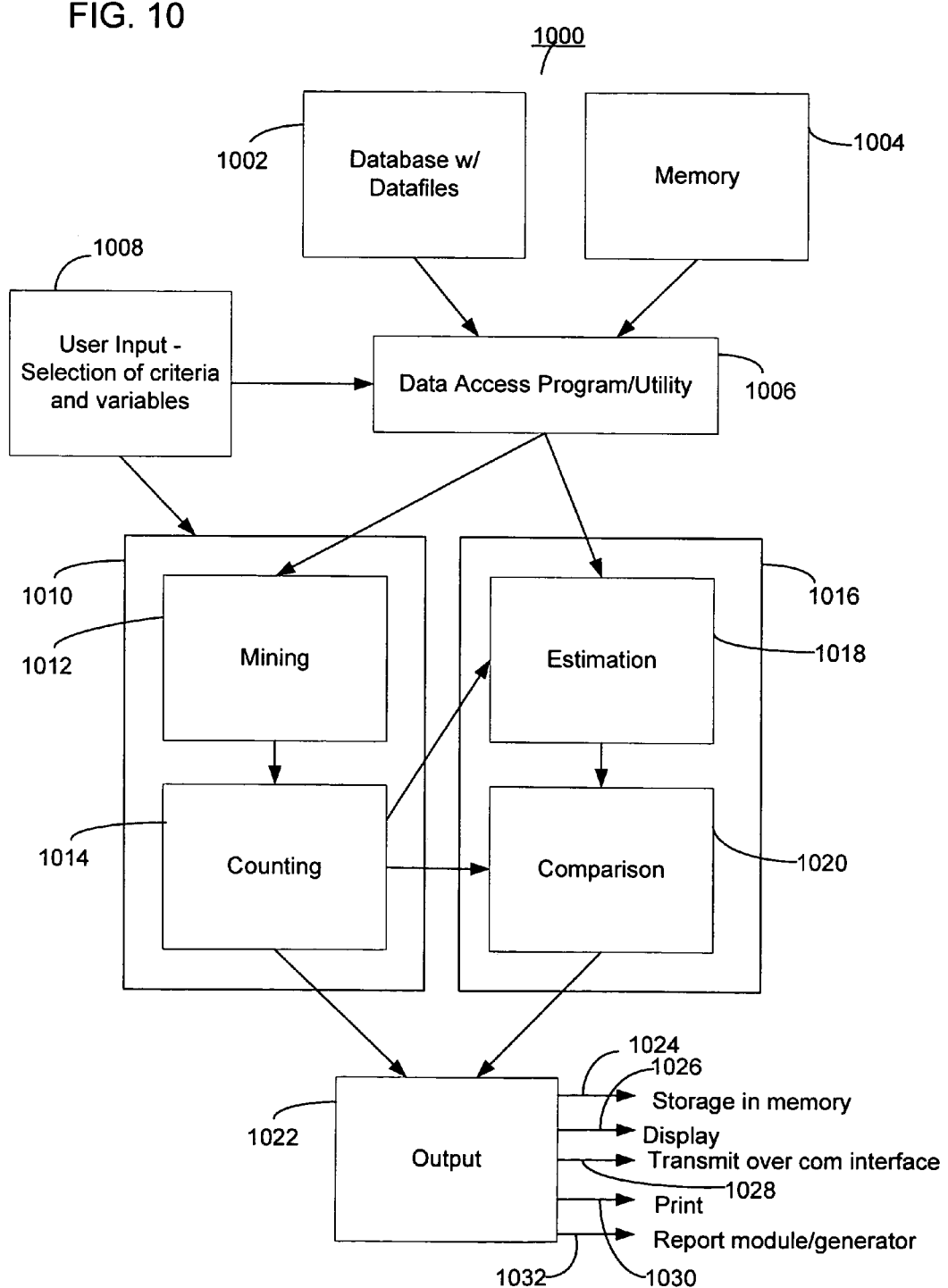
FIG. 10 is a functional block diagram of a system for determining maximum cardinality of a pattern in a sequence, expected frequency and/or surprise patterns from a time-stamped event sequence according to one embodiment of the present disclosure.

FIG. 10 illustrates one embodiment of a high level block diagram for a system for performing one or more embodiments of the present disclosure. A data mining computer system 1000 includes one or more processors (not shown) that may be configured with computer instructions for data access and data mining of a sequence containing time-stamped events or categories and analysis according to the present disclosure as described above. Data mining computer 1000 may be configured to determine the maximum cardinality of a pattern in a sequence. Data mining computer system 1000 may also determine a mean of the expected maximum cardinality of a pattern in a sequence and compare that with the determined maximum cardinality to identify a surprise pattern.

Data mining computer 1000 may include one or more databases 1002. Database 1002 includes one or more sequences of time-stamped events and/or event categories. Database 1002 may be any type of database including a simple compilation of data in a simple spreadsheet or word processing file. Data mining computer 1000 may include a memory 1004 that is any type of memory used in a computing or information processing system. A data access program, utility, or module 1006 accesses data stored in the data files of database 1002 and/or in memory 1004 for analysis.

A user input device 1008 receives user input associated with the selection of the sequence or sequences to be analyzed. Additionally, user input 1008 may receive a pattern definition to be data mined including one or more parameters or characteristics of the pattern. These may include one or more events, categories, time gaps, and or windows. User input 1008 may be directly associated with data mining computer 1000 or may be remote whereby user definable criteria and/or variables are provided via a communications link or channel (not shown). User input 1008 may be any type of input for example, another computer system, a personal data assistant, a pointing device, a keyboard, a memory, etc.

Data access module 1006 may provide a sequence and a pattern to a maximum cardinality module 1010 that includes a data mining sub-module 1012 and a disjoint occurrence counting sub-module 1014. Maximum cardinality module mines the sequence data to identify disjoint occurrences of the target pattern and counts the disjoint occurrences to provide a maximum cardinality of the pattern in the sequence to an output module 1022.

Data access module 1006 may provide the sequence data and the pattern to estimation and surprise pattern identification module 1016. Estimation sub-module 1018 receives the sequence, the pattern, and may receive the determined maximum cardinality from counting sub-module 1014. Estimation sub-module 1018 determines the expected maximum cardinality based on a probability distribution assumptions as discussed above. In some embodiments, estimation sub-module 1018 may determine bound $\mu^+$ and lower bound $\mu^-$ of the mean of the expected maximum cardinality.

A comparison sub-module 1020 receives the estimated maximum cardinality from the estimation sub-module 1018 and the determined maximum cardinality from counting sub-module 1014. Comparison sub-module 1018 performs a comparison of the estimated maximum cardinality and the determined maximum cardinality. Comparison sub-module 1018 may include one or more methods, criteria, and/or thresholds to provide for analysis of the pattern as a function of the estimated maximum cardinality and the determined maximum cardinality. Comparison sub-module 1018 may identify a surprising pattern as discussed above and provide its data and results to output 1022. Additionally, comparison sub-module may collect surprising or interesting patterns, rank them according to one or more criteria, filter them based on one or more filter characteristics, and/or analyze the patterns further.

Data mining computer output 1022 provides the received data from counting sub-module 1014 and/or comparison sub-module 1020 to storage in a memory 1024, to a display 1026, to a communication interface or facility 1028 for transmission to a remote system, to a local or remote printer 1030, and/or to a report module or generator 1032. Such outputs 1022 may include a visual or graphic representation of one or more surprising patterns, their rank, or various categories of patterns based, at least in part, on filtering one or more using a filter characteristic.

Generally, data mining computer 1000 may be configured with computer executable instructions on a computer readable medium for performing one or more of the methods disclosed above.

In operation, some embodiments of the present disclosure provide for reduced computational processing requirements and cost of data mining a pattern from one or more sequences. For example, the inventor tested a data set of 25 sequences each containing 105 events. Each of the 105 events were independently, uniformly and randomly assigned to one of 10 categories and distributed on a time line. Several tests were preformed to determine the impact on the computational cost for data mining and to determine the robustness of the method.

One embodiment of the present disclosure was tested to analyze the data set and to count different patterns in the data set. The method was implemented in Java and the test was run within Sun JRE 1.4.1 on a laptop with a 1.2 GHz CPU and 512 MB of main memory. All 25 sequences were loaded in main memory and the method in the form of software code was initiated.

The average runtime and count was tested for patterns with different temporal constraints. Two types of patterns were considered: $\{C1\}1-\beta\{C2\}1-\beta\{C3\}$ and $\{\omega: C1, C2, C3\}1-\beta\{C4\}$, where C1, C2, C3, C4 are the first four event categories, and $\omega=\beta$ varies from 10 to 106. In other words, the expected number of events in the search region (to match the next event in the same group or the next group) varies from 0.1 to 10,000. It was determined that patterns with multiple categories in a group are more difficult to count and more sensitive to the increase of the search region.

The method was found to scale sub-linearly with the search region size. The runtimes ranged from 6.4 milliseconds to 18.8 milliseconds for the first pattern and 9.6 milliseconds to 709.4 milliseconds for the second pattern. This reflected a considerable improvement over other methods.

Another test determined the average runtime and count for patterns with different lengths. In this case, two types of patterns were considered, $\{C1\}1-\beta\{Ck\}$ where each group contains only a single category, and $\{\omega: C1, \ldots, Ck-1\}1-\beta\{Ck\}$. $C1, \ldots, Ck$ are the first k event categories. $\beta=1000$, i.e., the search region (for a category) contains approximately 10 events in the sequence. In this case, the test demonstrated that the method provides for a linear scaling as a function of the length of patterns.

The scalability as a function of the sequence size of one embodiment of the method was also tested. In this test, three additional data sets were generated using similar settings except that the total number of evens (103, 104, and 106 respectively) and time range ([1, 105], [1, 106] and [1, 108] respectively) in each sequence are different for different data sets. Again, time period [t+1, t+100] was expected to contain a single event on average for all sequences. Two patterns were tested for averaged runtime and count: $\{C1\}1-\beta\{C2\}1-\beta\{C3\}$ and $\{\omega: C1, C2, C3,\}1-\beta\{C4\}$ where $C1, \ldots, C4$ are the first four event categories and $\omega=\beta=1000$. The total runtime for counting a single pattern in 25 sequences in the smallest data set was less than 1 millisecond. In testing, both the count and the runtime increased linearly as a function of the sequence size. Such as linear increase was an improvement over other methods that demonstrated a quadratic increase.

In this case, for pattern $\{C1\}1-\beta\{C2\}1-\beta\{C3\}$, the time required for processing was 0, 1.2, 11.6, and 114.2 milliseconds for sequences sizes 103, 104,105, and 106, respectively. The determined counts were 28.6, 301.4, 2,980.3, and 29,817.8, respectively. For pattern $\{(\omega: C1, C2, C3,\}1-\beta\{C4\}$, the time required for processing was 0, 1.6, 16.8 and 167.8 milliseconds for sequences sizes 103, 104, 105, and 106, respectively. The determined counts were 18.4, 186.2, 1858.4, and 18,696.0, respectively. These results represent a significant reduction in required processing time.

By application of the methods disclosed herein to other data mining methods and systems, similar improvements in data mining efficiency may be provided.

While the examples and descriptions are generally described with regard to a single sequence, this is only exemplary and is not intended to be limiting. It should be understood by one skilled in the art, the disclosed method and system may also determine maximum cardinality of a one or more patterns in two or more sequences. For example, a single sequence may be the maintenance events and records for one aircraft. However, two or more of the sequences of aircraft records may represent the maintenance records of a fleet of aircraft. As such, the present disclosure may identify a pattern that is common across two or more aircraft or across the fleet of aircraft or may identify a surprising pattern of maintenance related events across the fleet.

It is further to be understood that the methods or operations described herein are not to be construed as necessarily requiring their performance in the particular order discussed or illustrated. It is also to be understood that additional or alternative operations may be employed.

When introducing aspects of the present disclosure or embodiments thereof, the articles "a", "an", "the", and "said" are intended to mean that there are one or more of the elements. The terms "comprising", "including", and "having" are intended to be inclusive and mean that there may be additional elements other than the listed elements.

While various embodiments have been described in whole or in part, those skilled in the art will recognize modifications or variations that might be made without departing from the inventive concept. The examples illustrated in the present disclosure and are not intended to limit it. Therefore, the description and claims should be interpreted liberally with only such limitation as is necessary in view of the pertinent prior art.

APPENDIX A

| | |
|---|---|
| 1 | initialization |
| 1.1 | set c=0, j=0, and i=0 |
| 2 | if $(0 \leq i \leq m)$ e.g., within the range of S, then |
| 2.1 | if (group j not fully matched AND $i \leq m$), then |
| 2.1.1 | match event i against group j |
| 2.1.2 | increase i by 1 |
| 2.1.3 | if all event categories in group j are matched BUT $\omega_j$ violated), then |
| 2.1.3.1 | make h to be the smallest index such that $T(e_h) \geq T(e_i) - \omega_j$ |
| 2.1.3.2 | set i to h |
| 2.1.3.3 | remove all matches in group j |
| 2.1.4 | go to 2.1 |
| 2.2 | if group j cannot be matched and i > m, then go to 3 |
| 2.3 | else if $\beta_{j-1}$ is violated, then |
| 2.3.1 | make i the smallest index such that $T(e_h) \geq$ (latest time in group j)$- \beta_j$ |
| 2.3.2 | decrease j by 1 to rework the previous group |
| 2.4 | else // group j succeed |
| 2.4.1 | increase i so that $T(e_i) > \alpha_j +$ e.g., make i the latest time in group j |
| 2.4.2 | if c > 0, then |
| 2.4.2.1 | increase i so that $T(e_i) >$(earliest time in group j) in the last matched occurrence) |
| 2.4.3 | increase j by 1 |
| 2.5 | if j equals g, i.e., current occurrence is fully matched, then |
| 2.5.1 | increase c by 1 |
| 2.5.2 | remove event instances in current matched occurrence |
| 2.5.3 | reset j = 0 |

APPENDIX A-continued 2.5.4            direct i to point to the event right after earliest event in the current matched occurrence
2.6            go to 2
3    report c

APPENDIX B

1 Method initialization
1.1 Determine $\phi_{1,z}$ and $\lambda_1$
1.2 Determine $\delta$
1.3 Set $\psi_e = 0$, $\psi_o = \psi_1$
1.4 Determine $\gamma_1$
1.5 Assume $\sigma = 1$
1.6 Assume $\mu^- = \delta + \psi_e$ and $\mu+ = \delta + \psi_i + \gamma_1$
2 if $\mu^+ - \mu^- \leq \rho\mu^-$, then break, if not then
2.1 Determine $\phi_{k,z}$ and $\lambda_k$ for $k = 2\sigma, 2\sigma+1$
2.2 If $2\sigma \geq x$, then go to 3
2.3 Update $\psi_e$
2.4 Update $\mu^-$,
2.5 If $\mu^+ - \mu^- \geq \rho\mu^-$, then go to 3
2.6 If $2\sigma + 1 \geq x$, then go to 3
2.7 Update $\psi_o$
2.8 Update $\mu^+$
2.9 Set $\sigma = \sigma + 1$
2.10 Go to 2
3 Output $\mu^+$ and $\mu^-$

APPENDIX C

1    Method initialization
    1.1      Determine $\phi_{1,z}$ and $\lambda_1$:
            $\phi_{1,0} = 1$
            $\phi_{1,1} = -1$
            $\lambda_1 = q^{2(y-x+1)}$
    1.2      Determine $\delta$: $\delta = x - (q^{y-x+1}(1 - q^x))/1 - q)$
    1.3      Set $\psi_e = 0$, $\psi_o = \psi_1$: where
            $\psi_1 = q^{2y-2x+3}(1 - q)$
    1.4      Determine $\gamma_1$
            $\gamma_1 = \lambda_1((q^2 - q^x)/(1 - q) - (q^4 - q^{2x})(1 - q^2))$
    1.5      Set $\sigma = 1$
    1.6      Set $\mu^- = \delta + \psi_e$ and $\mu+ = \delta + \psi_o + \gamma_1$
2    while $(\mu^+ - \mu^- \leq \rho\mu^-)$, then break, if not then
    2.1      Determine $\phi_{k,z}$ and $\lambda_k$ for $k = 2\sigma, 2\sigma + 1$:

$$\varphi_{k,0} = \sum_{z=1}^{k} -\varphi_{k,z} q^z$$

$\phi_{k,z} = -(\phi_{k-1,z-1})/(1 - q^z)$
            $\lambda_k = -\lambda_{k-1}(1 - q^k)q^{y-x+1}$
    2.2      if $(2\sigma \geq x)$, then go to 3
    2.3      Update $\psi_e$:

$$\text{increase } \psi_e \text{ by } \sum_{z=1}^{2\sigma-2} \left[ \lambda_z \sum_{w=0}^{z} \varphi_{z,w}(q^{(2\sigma+1)(w+1)} + q^{2\sigma(w+1)}) \right]$$

2.4      Update $\mu^-$: Set $\mu^- = \delta + \psi_{2\sigma} + \gamma_{2\sigma}$
    2.5      If $(\mu^+ - \mu^- \leq \rho\mu^-)$, then go to 3
    2.6      If $(2\sigma + 1 \geq x)$, then go to 3
    2.7      Update $\psi_o$:

$$\text{increase } \psi_e \text{ by } \sum_{z=1}^{2\sigma-1} \left[ \lambda_z \sum_{w=0}^{z} \varphi_{z,w}(q^{(2\sigma+1)(w+1)} + q^{2\sigma(w+1)}) \right]$$

APPENDIX C-continued 2.8      Update $\mu^+$: Set $\mu^+ = \delta + \psi_{2\sigma+1} + \gamma_{2\sigma+1}$
    2.8      Set $\sigma = \sigma + 1$
3    Output $\mu^+$ and $\mu^-$

What is claimed is:

1. A method of determining distinct occurrences of a pattern in one or more sequences of time-stamped event instances, the method comprising:
   determining occurrences of a pattern of events in the one or more sequences;
   identifying occurrences of disjoints between occurrences of the pattern in the one or more sequences;
   determining a maximum cardinality of disjoint occurrences of the pattern in the one or more sequences as a function of the disjoint occurrences;
   estimating an expected quantity of distinct occurrences of the pattern as a function of the maximum cardinality; and
   calculating a lower bound and an upper bound of a mean of the expected quantity of distinct occurrences of the pattern.

2. The method of claim 1 wherein identifying occurrences includes matching event instances to a group within the pattern, and matching matched groups to the pattern.

3. The method of claim 2 wherein matching event instances to a group within a pattern includes determining that the matched event instances are within a group window size constraint of the group.

4. The method of claim 2 wherein matching matched groups to the pattern includes applying an upper time gap constraint of the pattern to the two or more matched groups.

5. The method of claim 2 wherein matching matched groups to the pattern includes applying a lower time gap constraint of the pattern to the two or more matched groups.

6. The method of claim 2, further comprising removing an event instance that is included in the identified disjoint occurrence from the sequence of time-stamped event instances.

7. The method of claim 6, further comprising repeating the method to identify further disjoint occurrences wherein the removed event instances are not included in the identification of more than one disjoint occurrence of the pattern.

8. The method of claim 2, further comprising flagging an event instance that is included in the identified disjoint occurrence from the sequence of time-stamped event instances.

9. The method of claim 8, further comprising repeating the method to identify further disjoint occurrences wherein the flagged event instances are not included in the identification of more than one disjoint occurrence of the pattern.

10. The method of claim 1 wherein a first occurrence is disjoint from a second occurrence when an intersection of event instances between the first occurrence and the second distinct occurrence is null.

11. The method of claim 1 wherein a first occurrence is disjoint to a second occurrence when an event instance occurs in only one of the first occurrence and the second occurrence.

12. The method of claim 1 wherein the event instances within the sequence are categorized into a predetermined set of categories.

13. The method of claim 1 wherein identifying occurrences includes matching categories of event instances to a group within the pattern, and matching matched categories to the pattern.

14. The method of claim 1 wherein determining includes:
matching a group of event categories to the sequence to identify an occurrence of the group within the sequence;
identifying a fully matched group wherein the event instances comprising the matched group are within a temporal window width defined by the group;
identifying an occurrence of the pattern by determining that a first matched group is within a temporal window of a second matched group, said temporal window defining the temporal relationship between the first group and the second group;
identifying event instances composing each identified pattern occurrence;
identifying disjoint occurrences from the identified pattern occurrences, wherein a particular event instance is an event instance in only one disjoint occurrence of the pattern; and
summing a count of all identified disjoint occurrences, said sum being the maximum cardinality of the pattern in the sequence.

15. The method of claim 1 wherein a parameter defining the pattern is at least one from the group consisting of an event instance, a category, a group, a minimum time gap, a maximum time gap, and a window size.

16. The method of claim 1 wherein the sequence comprises a temporal overlap of at least one occurrence of the pattern with another occurrence of the pattern.

17. The method of claim 1 wherein the time-stamped event instances are one or more events from the group consisting of an operation of a work device, a purchase, a bid, an action, a message, an event, and a score.

18. The method of claim 1 wherein a work device is an airplane and the time-stamped event instances are events associated with operations of the airplane.

19. The method of claim 18 wherein the disjoint occurrence is indicative of a required maintenance procedure associated with the work device.

20. The method of claim 1 wherein the two or more sequences are indicative of two or more airplanes comprising a fleet of airplanes and the time-stamped event instances are events associated with operations of the two, or more airplanes within the fleet of airplanes.

21. The method of claim 1 wherein an event instance includes one or more from the group consisting of a purchase, a sale, a transaction, a score, an alarm, a failure, an action, a bid, an omission, a request, an order, a message, an attempt, an interruption, a cancellation, and a change of a parameter.

22. A method of estimating an expected quantity of distinct occurrences of a pattern in a sequence of time-stamped events, said time stamped events being assigned to event categories, said pattern having a first event category and a second event category, the second event category being within a time gap of the first event category, said time gap having a minimum time gap and a maximum time gap, said sequence having a maximum time length, the method comprising:
counting instances of the first event in the sequence;
counting instances of the second event in the sequence;
determining the expected quantity of distinct occurrences of the pattern as a function of the quantity of first event instances, the quantity of second event instances, the maximum time length of the sequence, the minimum time gap, and the maximum time gap; and
calculating a lower bound and an upper bound of a mean of the expected quantity of distinct occurrences of the pattern in the sequence.

23. The method of claim 22 wherein calculating the lower bound and the upper bound of the mean of the expected quantity of distinct occurrences is a function of the minimum time gap and the maximum time gap over the maximum time length of the sequence.

24. The method of claim 22 wherein calculating the lower bound and the upper bound of the mean includes: determining an initial lower bound and an initial upper bound of the mean as a function of one or more from the group consisting of an estimation coefficient, an alternating adjustment factor, a base estimation of the mean of the expected quantity, an incremental estimation parameter, an estimation adjustment parameter, an estimation precision objective, the maximum time length of the sequence, the minimum time gap, and the maximum time gap.

25. The method of claim 22 wherein determining the expected quantity of distinct occurrences of the pattern comprises:
calculating a base estimation of a mean of an expected maximum cardinality;
determining an initial lower bound of the mean of the expected maximum cardinality as a function of the base estimation and an incremental estimation parameter;
determining an initial upper bound of the mean of the expected maximum cardinality as a function of the base estimation, an incremental estimation parameter, and an estimation adjustment parameter.

26. The method of claim 25, further comprising:
recalculating at least one of the initial lower bound and the initial upper bound of the mean of the expected maximum cardinality to determine at least one of a refined lower bound and a refined upper bound when the difference between the initial upper bound and the initial lower bound is greater than a precision objective.

27. The method of claim 26 wherein the precision objective is the product of an estimation precision objective and at least one of the initial lower bound and the refined lower bound.

28. The method of claim 26 wherein recalculating continues until the difference between a calculated upper bound and a calculated lower bound is less than or equal to the precision objective.

29. The method of claim 22 wherein the pattern comprises a complex pattern, said complex pattern having two or more sub-patterns wherein at least one sub-pattern includes two or more events, further comprising:
segmenting the complex pattern into a first sub-pattern and a second sub-pattern;
counting a quantity of the first sub-pattern in the sequence; and
counting a quantity of the second sub-pattern in the sequence,
wherein determining the expected quantity of distinct occurrences of the complex pattern is a function of the quantity of the first sub-pattern and the quantity of the second sub-pattern.

30. A method of identifying a surprise pattern within a sequence of time-stamped event instances, the method comprising:
calculating an expected quantity of distinct occurrences of a pattern in the sequence;
determining a maximum cardinality of the pattern in the sequence; and
identifying the surprise pattern as a function of the estimated quantity of distinct occurrences and the maximum cardinality.

31. The method of claim 30 wherein determining a surprise pattern includes determining an occurrence ratio as the ratio of the maximum cardinality over the expected quantity of distinct occurrences.

32. The method of claim 31 wherein an occurrence ratio greater than a predetermined surprise pattern threshold is indicative of a surprise pattern.

33. The method of claim 32 wherein the predetermined surprise pattern threshold is 20 percent.

34. The method of claim 30 wherein the maximum cardinality is a sum of a number of disjoint occurrences of the pattern in the sequence.

35. The method of claim 34 wherein a first disjoint occurrence is disjoint from a second disjoint occurrence such that an event instance is present in only one of the first disjoint occurrence and the second disjoint occurrence.

36. The method of claim 30 wherein determining the maximum cardinality includes:
identifying occurrences of the pattern in the sequence; and
identifying a disjoint occurrence from the occurrences.

37. The method of claim 30 wherein calculating the expected quantity of discrete occurrences includes:
counting first event instances in the sequence;
counting second event instances in the sequence; and
determining the expected quantity of distinct occurrences of the pattern as a function of the quantity of first event instances, the quantity of second event instances, a maximum time length of the sequence, and a minimum time gap and a maximum time gap between the second event instance and the first event instance.

38. A system for determining distinct occurrences of a pattern in a sequence of time-stamped event instances, the system comprising:
means for storing the sequence;
means for defining the pattern;
means for determining occurrences of a pattern of events in the one or more sequences;
means for identifying occurrences of disjoints between occurrences of the pattern in the one or more sequences;
means for determining a maximum cardinality of disjoint occurrences of the pattern in the sequence as a function of the disjoint occurrences;
means for estimating an expected quantity of distinct occurrences of the pattern as a function of the maximum cardinality; and
means for calculating a lower bound and an upper bound of a mean of the expected quantity of distinct occurrences of the pattern.

39. The system of claim 38 wherein the time-stamped event instances include events associated with an operation of an aircraft.

40. Computer readable medium including computer executable instructions for determining distinct occurrences of a pattern in a sequence of time-stamped event instances, the computer instructions comprising means for:
determining occurrences of a pattern of events in the one or more sequences;
identifying occurrences of disjoints between occurrences of the pattern in the one or more sequences;
determining a maximum cardinality of disjoint occurrences of the pattern in the sequence as a function of the disjoint occurrences;
estimating an expected quantity of distinct occurrences of the pattern as a function of the maximum cardinality; and
calculating a lower bound and an upper bound of a mean of the expected quantity of distinct occurrences of the pattern.

41. A system for estimating an expected quantity of distinct occurrences of a pattern in a sequence of time-stamped events, time stamped events being assigned to event categories, said pattern having a first event category and a second event category, the second event category being within a time gap of the first event category, said time gap having a minimum time gap and a maximum time gap, said sequence having a maximum time length, the system comprising:
means for counting instances of the first event in the sequence;
means for counting instances of the second event in the sequence;
means for determining the expected quantity of distinct occurrences of the pattern as a function of the quantity of first event instances, the quantity of second event instances, the maximum time length of the sequence, the minimum time gap, and the maximum time gap; and
means for calculating a lower bound and an upper bound of a mean of the expected quantity of distinct occurrences of the pattern in the sequence.

42. Computer readable medium including computer executable instructions for estimating an expected quantity of distinct occurrences of a pattern in a sequence of time-stamped events, time stamped events being assigned to event categories, said pattern having a first event category and a second event category, the second event category being within a time gap of the first event category, said time gap having a minimum time gap and a maximum time gap, said sequence having a maximum time length, the computer executable instructions comprising:
means for counting instances of the first event in the sequence;
means for counting instances of the second event in the sequence;
means for determining the expected quantity of distinct occurrences of the pattern as a function of the quantity of first event instances, the quantity of second event instances, the maximum time length of the sequence, the minimum time gap, and the maximum time gap; and
means for calculating a lower bound and an upper bound of a mean of the expected quantity of distinct occurrences of the pattern in the sequence.

43. A system for identifying a surprise pattern within a sequence of time-stamped event instances, the system comprising:
means for storing the sequence of time-stamped event instances;
means for defining the pattern;
means for calculating an expected quantity of distinct occurrences of a pattern in the sequence;
means for determining a maximum cardinality of the pattern in the sequence; and
means for identifying the surprise pattern as a function of the estimated quantity of distinct occurrences and the maximum cardinality.

44. The system of claim 43 wherein the time-stamped event instances are events associated with an operation of an aircraft.

45. The system of claim 44 wherein the surprise pattern is indicative of a required maintenance procedure on the aircraft.

46. Computer readable medium including computer executable instructions for identifying a surprise pattern within a sequence of time-stamped event instances, the computer instructions comprising:
  means for calculating an expected quantity of distinct occurrences of a pattern in the sequence;
  means for determining a maximum cardinality of the pattern in the sequence; and
  means for identifying the surprise pattern as a function of the estimated quantity of distinct occurrences and the maximum cardinality.

* * * * *